US012720442B2

(12) United States Patent
Yu et al.

(10) Patent No.: US 12,720,442 B2
(45) Date of Patent: Aug. 25, 2026

(54) MULTI-RATE AND MULTI-POWER AGGREGATED PSDU BASED LOW LATENCY TRANSMISSION

(71) Applicant: NEWRACOM, Inc., Irvine, CA (US)

(72) Inventors: Heejung Yu, Daejeon (KR); Joonsoo Lee, Seoul (KR); Si-Chan Noh, Seoul (KR)

(73) Assignee: NEWRACOM, Inc., Irvine, CA (US)

(*) Notice: Subject to any disclaimer, the term of this patent is extended or adjusted under 35 U.S.C. 154(b) by 309 days.

(21) Appl. No.: 18/672,800

(22) Filed: May 23, 2024

(65) Prior Publication Data

US 2024/0397440 A1 Nov. 28, 2024

Related U.S. Application Data

(60) Provisional application No. 63/504,036, filed on May 24, 2023.

(51) Int. Cl.
*H04W 52/26* (2009.01)
*H04L 1/00* (2006.01)
(Continued)

(52) U.S. Cl.
CPC ......... *H04W 52/267* (2013.01); *H04L 1/0003* (2013.01); *H04L 5/0053* (2013.01); *H04W 52/58* (2013.01); *H04W 52/60* (2013.01)

(58) Field of Classification Search
None
See application file for complete search history.

(56) References Cited

U.S. PATENT DOCUMENTS 9,872,298 B2 * 1/2018 Verma ............... H04W 72/0473
2013/0176864 A1 * 7/2013 Quan .................... H04L 1/0002 370/252
2023/0300883 A1 * 9/2023 Fang ................ H04W 74/0808 370/329

FOREIGN PATENT DOCUMENTS

WO WO-2024120887 A1 * 6/2024 ............ H04W 84/12

OTHER PUBLICATIONS

IEEE 802.11-2020: "Part 11: Wireless LAN Medium Access Control (MAC) and Physical Layer (PHY) Specifications," IEEE Standard for Information technology—Telecommunications and information exchange between systems Local and metropolitan area networks—Specific requirements, Dec. 3, 2020, 4379 pages.

(Continued)

*Primary Examiner* — Brian S Roberts
(74) *Attorney, Agent, or Firm* — Nicholson, De Vos, Webster & Elliott, LLP

(57) ABSTRACT

An embodiment is a method performed by a first wireless device in a wireless network to transmit a multi-power and multi-rate aggregated physical layer service data unit (A-PSDU) to allow low latency transmission in the wireless network. The method includes wirelessly transmitting the multi-power and multi-rate A-PSDU, wherein the multi-power and multi-rate A-PSDU includes a plurality of PSDUs, wherein one or more of the plurality of PSDUs are transmitted using a first transmission power and a first rate and one or more of the PSDUs are transmitted using a second transmission power that is lower than the first transmission power and a second rate that is more robust than the first rate, wherein low latency transmission by other wireless devices is allowed during the transmission of the one or more PSDUs that are transmitted using the second transmission power and the second rate.

23 Claims, 26 Drawing Sheets

(51) Int. Cl.
*H04L 5/00* (2006.01)
*H04W 52/58* (2009.01)
*H04W 52/60* (2009.01)

(56) References Cited

OTHER PUBLICATIONS

IEEE 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.
IEEE 802.11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.
IEEE 802.11ax-2021: "Part 11: Wireless LAN Medium Access Control (MAC) and Physical Layer (PHY) Specifications, Amendment 1: Enhancements for High-Efficiency WLAN," IEEE Standard for Information technology—Telecommunications and information exchange between systems Local and metropolitan area networks—Specific requirements, published 2021, 767 pages.
IEEE 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.
IEEE 802.11bd-2022: "Part 11: Wireless LAN Medium Access Control (MAC) and Physical Layer (PHY) Specifications, Amendment 5: Enhancements for Next Generation V2X," IEEE Standard for Information technology—Telecommunications and information exchange between systems Local and metropolitan area networks—Specific requirements, published Mar. 10, 2023, 144 pages.
IEEE 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.
IEEE 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.
IEEE 802.11p-2010: "Part 11: Wireless LAN Medium Access Control (MAC) and Physical Layer (PHY) Specifications, Amendment 6: Wireless Access in Vehicular Environments," IEEE Standard for Information technology—Telecommunications and information exchange between systems Local and metropolitan area networks—Specific requirements, Jul. 15, 2010, 51 pages.
IEEE P802.11be/D3.0: "Part 11: Wireless LAN Medium Access Control (MAC) and Physical Layer (PHY) Specifications Amendment 8: Enhancements for extremely high throughput (EHT)", Draft Standard for Information technology—Telecommunications and information exchange between systems Local and metropolitan area networks—Specific requirements, IEEE P802.11be™ /D3.0, Jan. 2023, 999 pages.

* cited by examiner 352
342
RF XMTR
324
TX SIGNAL PROCESSING UNIT
DATA
300
ENCODER
302
INTER-LEAVER
304
MAPPER
306
IFT
308
GI INSERTER 354
344
RF RCVR
326
RX SIGNAL PROCESSING UNIT
318
GI REMOVER
316
FT
314
DE-MAPPER
312
DEINTER-LEAVER
310
DECODER
DATA

| | MAXIMUM PHY RATE | PHY RATE ENHANCEMENT | BANDWIDTH/NUMBER OF SPATIAL STREAMS | OPERATING BANDS |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

700

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 μs | - | - | equivalent to 1,250 kHz |
| LEGACY-LONG TRAINING FIELD (L-LTF) 714 | NON-HT LONG TRAINING FIELD (LTF) | 8 μs | 3.2 μs | 1.6 μs | 312.5 kHz |
| LEGACY-SIGNAL FIELD (L-SIG) 716 | NON-HT SIGNAL FIELD | 4 μs | 3.2 μs | 0.8 μs | 312.5 kHz |
| RL-SIG FIELD 718 | REPEATED NON-HT SIGNAL FIELD | 4 μs | 3.2 μs | 0.8 μs | 312.5 kHz |
| U-SIG FIELD 720 | UNIVERSAL SIGNAL FIELD | $N_{USIG}$ * 4 μs | 3.2 μs | 0.8 μs | 312.5 kHz |
| EHT-SIG FIELD 722 | EHT SIGNAL FIELD | $N_{EHESIG}$ * 4 μs | 3.2 μs | 0.8 μs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | $N_{EHTLTF}$ * (DTF period + GI) μs | 2xLTF: 6.4 μs 4xLTF: 12.8 μs | 0.8, 1.6, or 3.2 μs | 2xLTF: (equivalent to) 156.25 kHz; 4xLTF: 78.125 kHz |
| EHT-DATA FIELD 730 | EHT DATA FIELD | $N_{DATA}$ * (DTF period + GI) μs | 12.8 μs | 0.8, 1.6, or 3.2 μs | 78.125 kHz |
| EHT-MA FIELD 732 | EHT MIDAMBLE FIELD | - | - | - | - |

FIG. 7

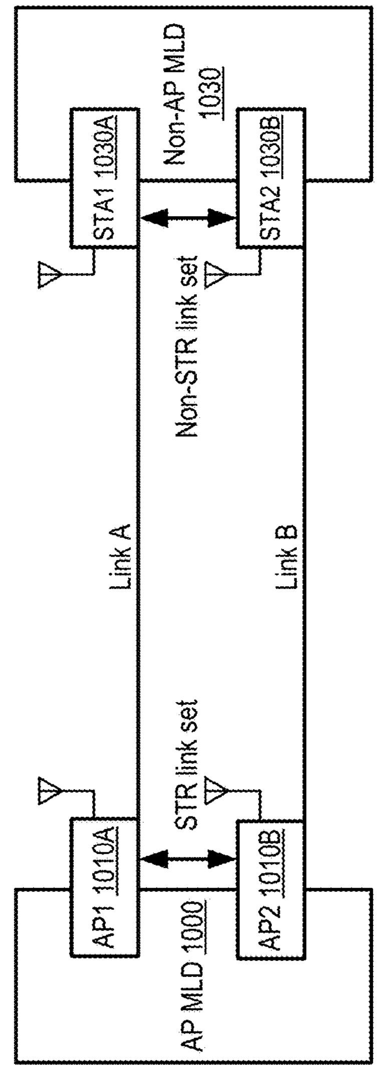
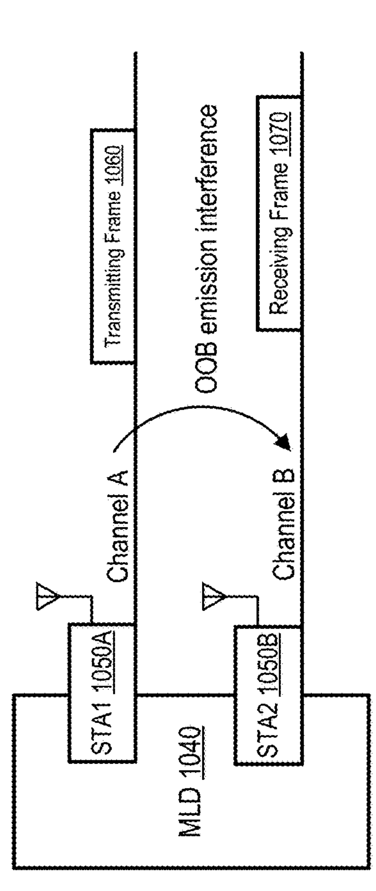
FIG. 10

MULTI-RATE AND MULTI-POWER AGGREGATED PSDU BASED LOW LATENCY TRANSMISSION

CROSS-REFERENCE TO RELATED APPLICATION

This application claims the benefit of U.S. Provisional Application No. 63/504,036, filed May 24, 2023, titled, "Multi-rate and Multi-power Aggregated PSDU based Low Latency Transmission," which is hereby incorporated by reference.

TECHNICAL FIELD

The present disclosure generally relates to wireless communications, and more specifically, relates to transmitting a multi-power and multi-rate aggregated physical layer service data unit (A-PSDU) to allow low latency transmission in a wireless network.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 Gigahertz (GHz) as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 Megahertz (MHz) apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

The scope of future wireless networking standards (e.g., beyond IEEE 802.11be) is expected to include low latency traffic delivery for real-time services such as virtual reality (VR), augmented reality (AR), and/or mixed reality (MR). With current wireless networking standards, if a station (STA) acquires a transmission opportunity (TXOP), other STAs are not allowed to transmit during the TXOP to guarantee the safe transmission of the TXOP owner's frames. TXOPs can last for a relatively long time. Such an operational scenario prevents low latency transmission (LLT) by other STAs in the wireless network.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 7 shows a table, which describes fields of an Extreme High Throughput (EHT) frame format, in accordance with some embodiments of the present disclosure.

FIG. 10 is a diagram showing out-of-band (OOB) emission interference problem in a NSTR non-AP MLD, according to some embodiments.

DETAILED DESCRIPTION

Figure 1:
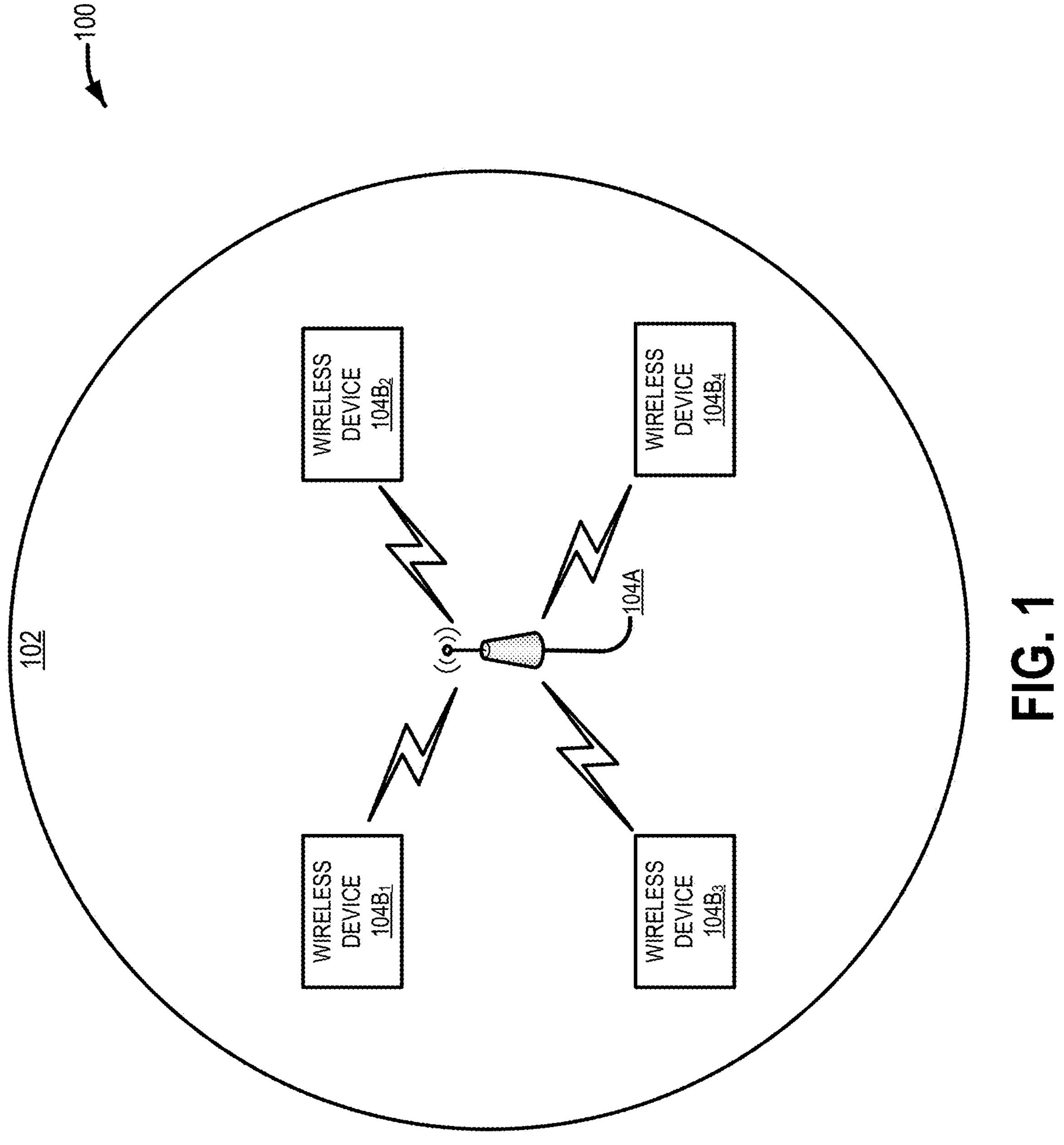
FIG. 1 illustrates an example wireless local area network (WLAN) with a basic service set (BSS) that includes a plurality of wireless devices, in accordance with some embodiments of the present disclosure.

One aspect of the present disclosure generally relates to wireless communications, and more specifically, relates to transmitting a multi-power and multi-rate aggregated physical layer service data unit (A-PSDU) to allow low latency transmission in a wireless network.

As mentioned above, with current wireless networking standards, if a station (STA) acquires a transmission opportunity (TXOP), other STAs are not allowed to transmit during the TXOP to guarantee the safe transmission of the TXOP owner's frames. TXOPs can last for a relatively long time. Such an operational scenario prevents low latency transmission (LLT) by other STAs in the wireless network. That is, it prevents a STA that has low latency data (data that needs to be transmitted with low latency) from transmitting the low latency data until the TXOP is over.

Embodiments are disclosed herein that can guarantee long TXOPs for high throughput STAs, while at the same time giving low latency transmission (LLT) STAs (STAs that have low latency data to transmit) an opportunity to access the wireless medium during the middle of a TXOP acquired by a non-LLT STA in a wireless network that uses a distributed competition-based channel access mechanism.

According to some embodiments, in a network where an access point (AP), a non-LLT STA (a STA that has regular (non-low latency) data to transmit), and a LLT STA (a STA that has low latency data to transmit) coexist, the AP may transmit a multi-power and multi-rate A-PSDU to the non-LLT STA during the AP's TXOP. The A-PSDU may include a plurality of PSDUs, where one or more of the PSDUs are transmitted using a first transmission power and a first (data) rate and one or more of the PSDUs are transmitted using a second transmission power that is lower than the first transmission power and a second rate that is more robust (e.g., a lower data rate) than the first rate. The LLT STA may transmit overlapped data frames that include low latency data during the transmission of the one or more PSDUs that are transmitted using the second transmission power and the second rate. In this way, embodiments allow the LLT STA to transmit low latency data during (in the middle of) a long TXOP, thereby reducing the delay/latency of delivering low latency data.

In an embodiment, the multi-power and multi-rate A-PSDU includes a plurality of first signal fields each corresponding to one of the plurality of PSDUs included in the multi-power and multi-rate A-PSDU. Each of the plurality of first signal fields may include length information and rate information for a corresponding PSDU. The LLT STA may determine that a particular PSDU included in the multi-power and multi-rate A-PSDU will be transmitted using the (more robust) second rate based on the rate information included in the first signal field corresponding to the particular PSDU. The LLT STA may determine the length of the particular PSDU based on the length information included in the first signal field corresponding to the particular PSDU. The LLT STA may thus determine when a PSDU will be transmitted using the (more robust) second rate and for how long such PSDU will be transmitted, thereby allowing the LLT STA to know when it is allowed to transmit overlapped low latency data and for how long it is allowed to transmit overlapped low latency data.

In an embodiment, the multi-power and multi-rate A-PSDU includes a plurality of second signal fields each corresponding to one of the plurality of PSDUs. Each of the plurality of second signal fields may include identifying information indicating a STA that the corresponding PSDU is intended for. In an embodiment, the identifying information includes a group identifier and a STA identifier. The group identifier may identify a particular group of STAs. The STA identifier may identify a particular STA within that group. A STA that detects the multi-power and multi-rate A-PSDU may determine whether a particular PSDU included in the multi-power and multi-rate A-PSDU is intended for itself based on the identifying information included in the second signal field corresponding to the particular PSDU (e.g., based on whether the group identifier and the STA identifier included in such second signal field matches the STA's own group identifier and STA identifier, respectively). If the STA determines that the particular PSDU is indeed intended for itself, the STA may further process the particular PSDU. Otherwise, if the particular PSDU is not intended for itself, the STA may transition to a power save mode to save power. Transmission efficiency may be increased by allowing the multi-power and multi-rate A-PSDU to include PSDUs intended for different STAs. Also, power savings can be achieved by allowing STAs to transition to a power save mode and stay in the power save mode during transmission of particular PSDUs included in the multi-power and multi-rate A-PSDU that are not intended for itself.

In an embodiment, the multi-power and multi-rate A-PSDU includes one or more midambles each corresponding to one of the PSDUs included in the multi-power and multi-rate A-PSDU. A STA may automatically control the gain during reception of a particular PSDU included in the multi-power and multi-rate A-PSDU based on the midamble corresponding to that PSDU.

In an embodiment, the AP determines the link qualities of the links between the AP and various STAs that the multi-power and multi-rate A-PSDU is intended for. The AP may then determine that PSDUs of the multi-power and multi-rate A-PSDU that are intended for STAs connected to good quality links are to be transmitted using the first transmission power and the first rate and that PSDUs of the multi-power and multi-rate A-PSDU that are intended for STAs connected to poor quality links are to be transmitted using the second (lower) transmission power and the second (more robust) rate.

In an embodiment, the AP is a multi-link device (MLD) that performs multi-link operations (MLO) using a first link and a second link. The AP may transmit a multi-power and multi-rate A-PSDU to a non-simultaneous transmit and receive (NSTR) STA on the first link and transmit a data frame with low latency data to the NSTR STA on the second link. The multi-power and multi-rate A-PSDU may include a plurality of PSDUs, where one or more of the PSDUs are transmitted using a first transmission power and a first rate and one or more of the PSDUs are transmitted using a second transmission power that is lower than the first transmission power and a second rate that is more robust (e.g., lower data rate) than the first rate. The NSTR STA may transmit an acknowledgement (ACK) frame that acknowledges the data frame (that included low latency data) to the AP on the second link while simultaneously receiving one of the PSDUs of the multi-power and multi-rate A-PSDU that is transmitted using the second (lower) transmission power and the second (more robust) rate. In this way, embodiments allow the NSTR STA to simultaneously transmit and receive frames, thereby reducing delay/latency of transmission (e.g., reducing the delay of delivering the ACK frame in this example).

For purposes of illustration, various embodiments are described herein in the context of wireless networks that are based on IEEE 802.11 standards and using terminology and concepts thereof. Those skilled in the art will appreciate that the embodiments disclosed herein can be modified/adapted for use in other types of wireless networks.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104$B_1$-104$B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104$B_1$-104$B_4$) may be collectively referred to as STAs. However, for case of description, only the non-AP STAs may be referred to as STAs. Although shown with four non-AP STAs (e.g., the wireless devices 104$B_1$-104$B_4$), the WLAN 100 may include any number of non-AP STAs (e.g., one or more wireless devices 104B).

Figure 2:
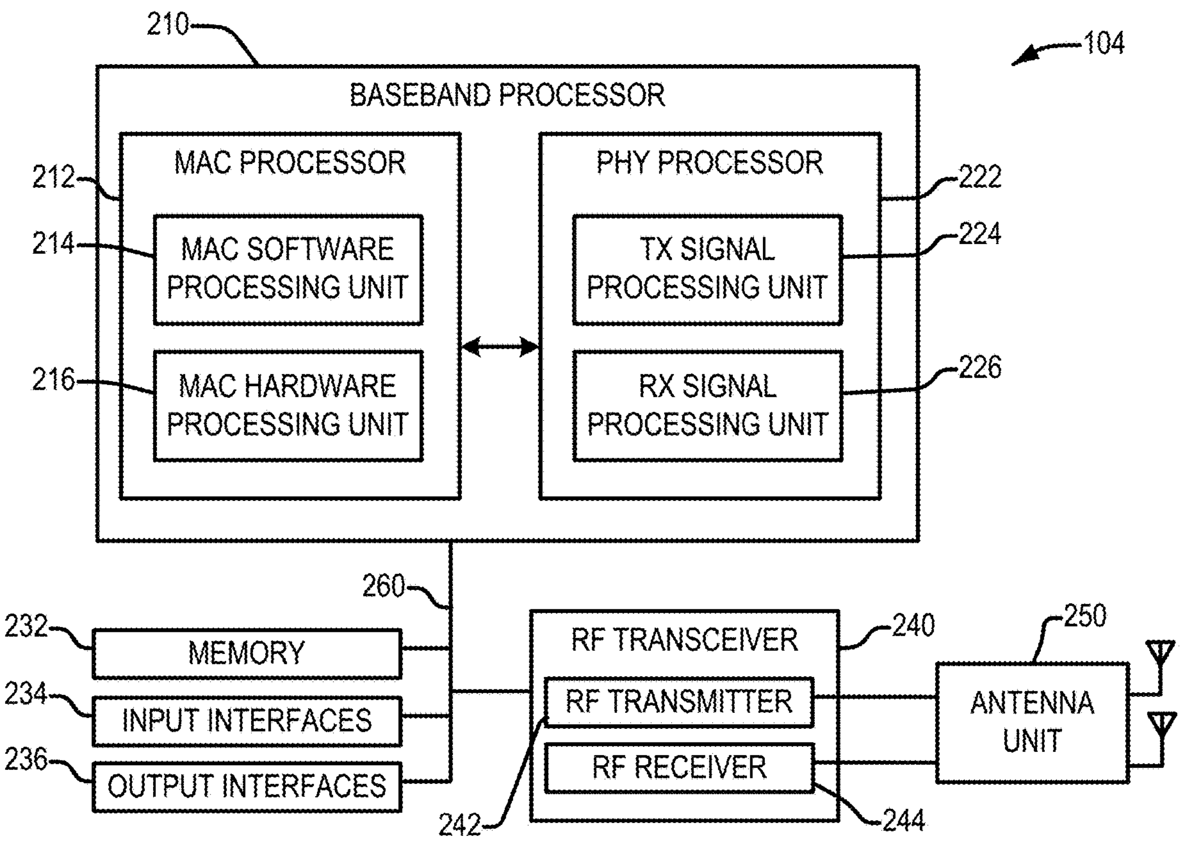
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104$B_1$-104$B_4$ in FIG. 1. The wireless device 104 includes a baseband processor 210, a radio frequency (RF) transceiver 240, an antenna unit 250, a storage device (e.g., memory device) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figures 3A, 3B:
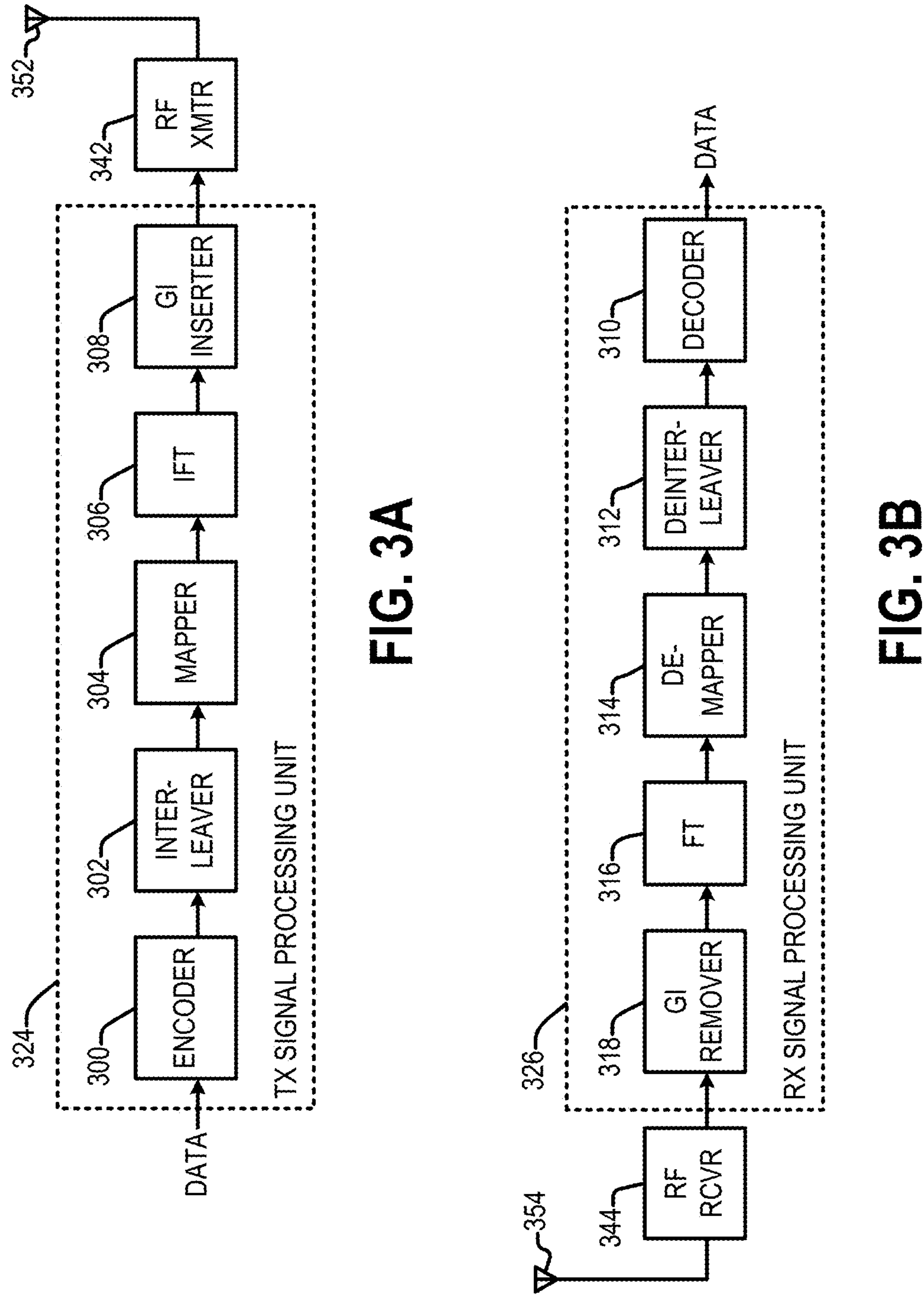
FIG. 3A illustrates components of a wireless device configured to transmit data, in accordance with some embodiments of the present disclosure.
FIG. 3B illustrates components of a wireless device configured to receive data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of Os or Is. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-timc block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
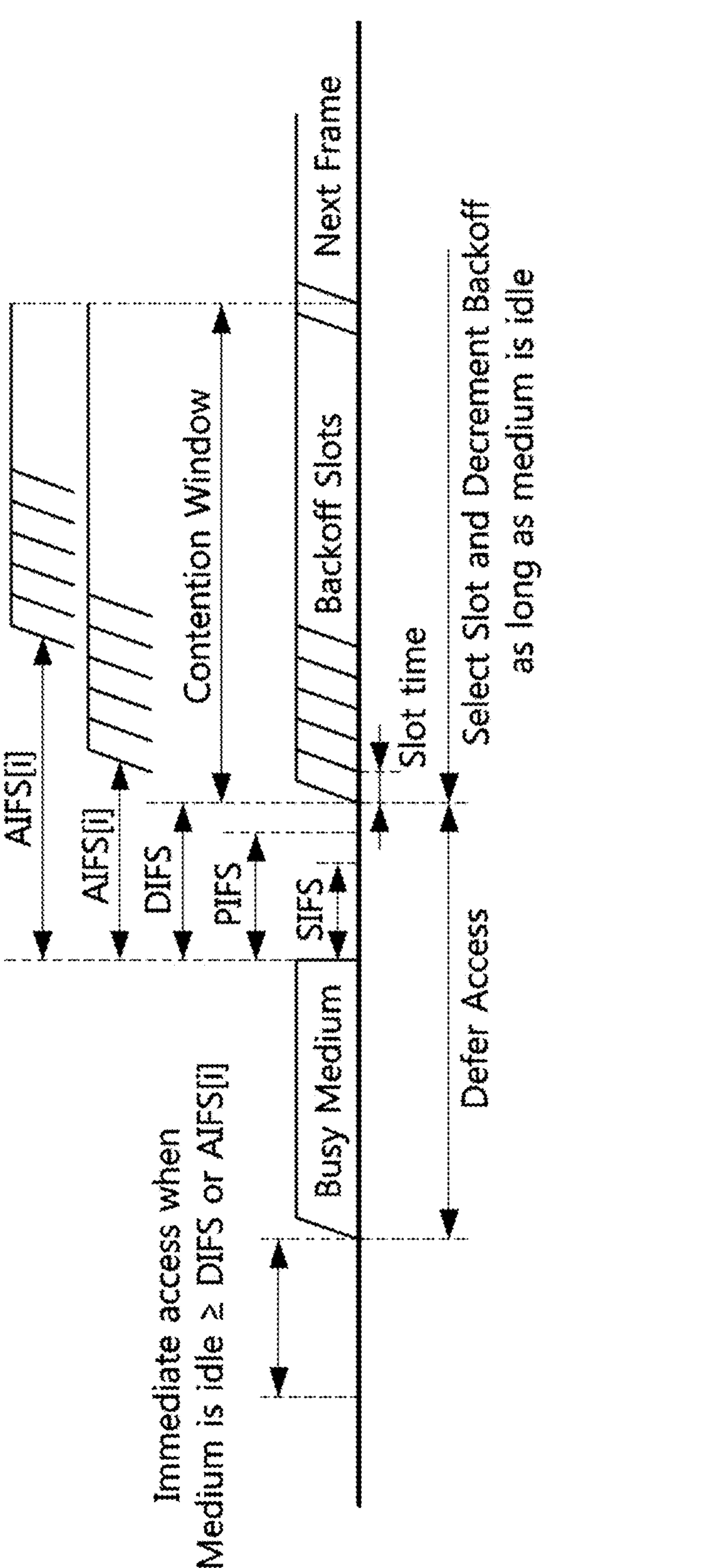
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS [i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QOS) functionality (that is, a QOS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
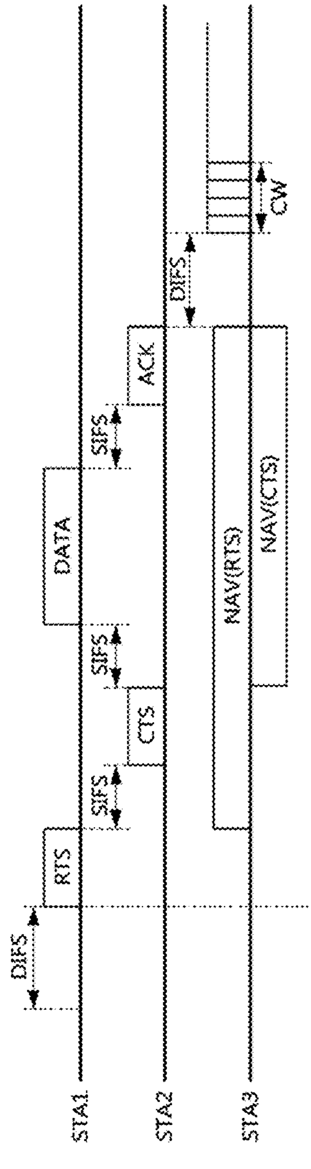
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

Figure 6:
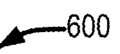
FIG. 6 shows a table comparing various iterations of Institute of Electrical and Electronics Engineers (IEEE) 802.11 standard, in accordance with some embodiments of the present disclosure.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (Bx) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARQ)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable.

With respect to operational bands (e.g., 2.4/5/6 GHZ) for IEEE 802.11be, more than 1 GHz of additional unlicensed spectrum is likely to be available because the 6 GHz band (5.925-7.125 GHZ) is being considered for unlicensed use. This would allow APs and STAs to become tri-band devices. Larger than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFTs) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARQ) 724, EHT short training field (EHT-STF) 726, EHT long training field (EHT-LTF) 728, EHT data field 730, and EHT midamble field (EHT-MA) 732.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink (UL)/downlink (DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU-MIMO transmissions. Therefore, DL-OFDMA, DL-MU-MIMO, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HARQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP cooperation has been discussed as a possible technology to be adopted in IEEE 802.11be, where there is high level classification depending on various AP cooperation schemes. For example, there is a first type of cooperation scheme in which data for a user is sent from a single AP (sometimes referred to as "coordinated") and there is a second type of cooperation scheme in which data for a user is sent from multiple APs (sometimes referred to as "joint").

For the coordinated scheme, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. For the joint scheme, multiple APs are transmitting jointly to a given user.

Next-generation wireless networks (e.g., WLANs based on IEEE 802.11 wireless networking standards) are evolving in the direction of reducing latency and power consumption, as well as improving manageability and throughput to improve the reliability of network connectivity.

In dense wireless networks, many wireless devices may transmit high throughput traffic. Wireless networks may use a distributed competition-based medium access mechanism, which generally has lower throughput efficiency compared to a centrally-controlled medium access mechanism due to added overhead such as backoff time, interframe space (IFS), control/management frame exchanges, and/or frame headers.

Existing wireless networks that use a distributed competition-based medium access mechanism use techniques such as TXOP (transmit opportunity), aggregation, and block acknowledgment (ACK) to allow a single wireless device to occupy the wireless medium for a relatively long period of time, thereby improving efficiency and significantly increasing throughput.

The TXOP technique can help reduce distributed competition overhead and protocol/frame overhead by guaranteeing medium access rights for a particular wireless device that has acquired the medium through distributed competition. TXOP is an important technique that enables high-speed and large data transmissions (e.g., for multimedia applications) in wireless networks.

Next generation wireless networks are expected to be able to support real-time ultra-low latency applications such as augmented reality (AR), virtual reality (VR), industrial Internet of Things (IoT), connected cars, connected drones, multi-player gaming, and connected medical equipment, just to name a few examples. Therefore, there is a need to reduce latency in wireless networks while still maintaining compatibility with conventional high-throughput wireless devices.

In order to improve network throughput, long TXOPs should be granted and guaranteed to wireless devices to allow wireless devices to have exclusive access to the wireless medium for an extended period of time. However, at the same time, a network technology is needed that allows latency-sensitive wireless devices to access the wireless medium during another wireless device's TXOP. The ability to transmit latency-sensitive data (e.g., emergency data) with low latency may become an important feature of next-generation wireless networks.

Figure 8:
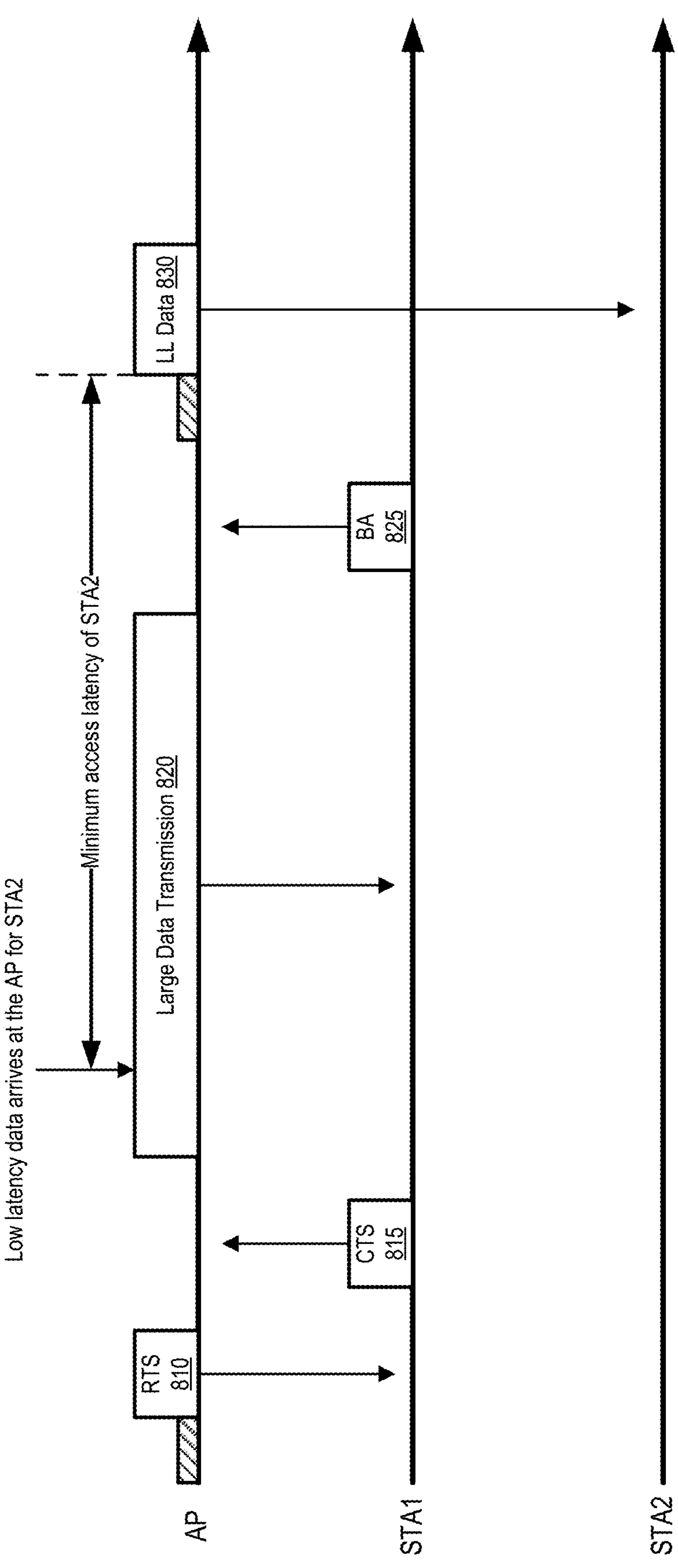
FIG. 8 is a diagram showing a situation in which an AP transmits a large data frame, which delays the transmission of the AP's low latency data.
Figure 9:
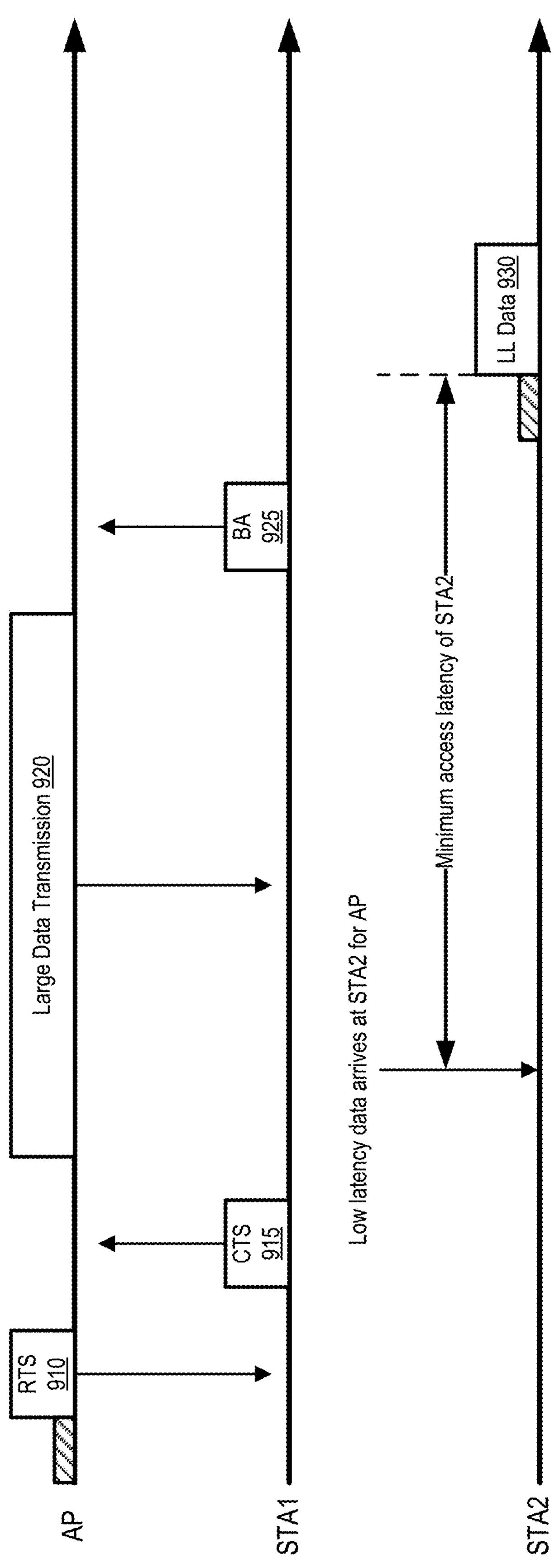
FIG. 9 is a diagram showing a situation in which an AP transmits a large data frame, which delays the transmission of a LLT STA's low latency data.

FIG. 8 and FIG. 9 are diagrams showing situations in which an AP acquires a long TXOP and transmits a large data frame, which results in delaying the transmission of low latency data. In the situation shown in FIG. 8, the low latency transmitter is the TXOP holder (the AP shown in FIG. 8). In the situation shown in FIG. 9, the low latency transmitter is not the TXOP holder (STA2 shown in FIG. 9).

FIG. 8 is a diagram showing a situation in which an AP transmits a large data frame, which delays the transmission of the AP's low latency data.

As shown in the diagram, the AP may transmit a RTS (request-to-send) frame 810 to STA1 and STA1 may respond by transmitting a CTS (clear-to-send) frame 815 to the AP. In this case, the AP is the TXOP holder. The AP may then transmit a large data frame 820 to STA1 during the TXOP. STA1 may then transmit a block acknowledgement (ACK) (BA) frame 825 to the AP if it successfully receives the large data frame 820.

As shown in the diagram, the AP may determine that it has low latency data to transmit to STA2 during the middle of its transmission of the large data frame 820. In this case, the AP cannot transmit a low latency data frame 830 (that includes the low latency data) to STA2 until after the AP finishes transmitting the large data frame 820 to STA1 and also after STA1 finishes transmitting the BA frame 825 to the AP. As a result, there is a minimum access latency for the AP to transmit the low latency data frame 830 to STA2.

FIG. 9 is a diagram showing a situation in which an AP transmits a large data frame, which delays the transmission of a LLT STA's low latency data.

As shown in the diagram, the AP may transmit a RTS frame 910 to STA1 and STA1 may respond by transmitting a CTS frame 915 to the AP. In this case, the AP is the TXOP holder. The AP may transmit a large data frame 920 to STA1 during the TXOP. STA1 may then transmit a BA frame 925 to the AP if it successfully receives the large data frame 920.

As shown in the diagram, STA2 may determine that it has low latency data to transmit to the AP during the middle of the AP's transmission of the large data frame 920. In this case, STA2 is a low latency transmission (LLT) STA that is not a TXOP holder. As used herein, a LLT STA may be a STA that has low latency data (e.g., data that needs to be transmitted with lower latency compared to regular data) to transmit. Also, as used herein, a non-LLT STA may be a STA that has non-low latency data to transmit. It should be understood that a particular STA can be a LLT STA in some situations and be a non-LLT STA in other situations. In the example shown in the diagram, STA2 cannot transmit a low latency data frame 930 (that includes the low latency data) to the AP until after the AP finishes transmitting the large data frame 920 to STA1 and also after STA1 finishes transmitting the BA frame 925 to the AP. That is, STA2 must wait for the TXOP of the AP to expire before it can transmit a low latency data frame 930 to the AP. As a result, there is a minimum access latency for STA2 to transmit the low latency data frame 930 to the AP.

One technique to reduce the latency of low latency transmissions is to allow transmissions to overlap during the TXOP. With such an overlapped transmission technique, the LLT STA (e.g., STA2 in FIG. 9) is allowed to transmit low latency data in the middle of the non-LLT STA's (e.g., AP in FIG. 9) TXOP while the non-LLT STA is actively transmitting. At this time, a method of selectively transmitting low latency data based on CQI (Channel Quality Indication) may be used to prevent the transmission of non-LLT STA as much as possible. Allowing low latency transmission in a subchannel with poor channel quality instead of a subchannel with good channel quality may be beneficial for both the LLT STAs and the non-LLT STAs.

However, a drawback of such overlapped transmission technique is that the quality of the signal may be degraded due to signal interference between the LLT STA's transmission and the non-LLT STA's transmission. This may cause the transmission/reception of the low latency data to fail, which may result in additional latency (e.g., due to having to retransmit the low latency data). The overlapped transmission of non-low latency data and low latency data may result in a collision, resulting in a high probability of transmission failure for both the low latency data and the non-low latency data.

Another technique to reduce the latency of low latency data transmissions is to pause the TXOP and allow low latency transmission based on signaling for preemption. Alternatively, a link or channel dedicated for preemption can be allocated before the TXOP.

However, such preemption signaling technique has a few drawbacks. Low latency traffic consists mostly of short frames so adding additional signaling to allow for preemption of a TXOP becomes relatively large overhead, resulting in minimal latency reduction. Also, low latency traffic has sporadic characteristics, making it difficult to implement the signaling needed to preempt the TXOP.

Another technique to reduce the latency of low latency data transmissions is by transmitting fragmented PPDUs that are separated by an interframe space (IFS) interval that is longer than the typical IFS interval used in the wireless network and to allow low latency transmissions during the IFS interval between fragmented PPDUs.

However, a drawback of such fragmented PPDU transmission technique is that efficiency is reduced due to the longer IFS interval and content overhead (e.g., each fragmented PPDU has to have its own header information, which adds to the overhead). Also, control is complicated.

Another technique to reduce the latency of low latency data transmissions is to transmit low latency data in a channel with relatively poor channel quality (based on channel quality indicator (CQI)) to reduce a performance degradation effect.

However, a drawback of such CQI-based overlapped transmission is that a PPDU is transmitted without data payload rate control so non-low latency data transmission has a large loss.

Aggregation techniques such as aggregated MAC service data unit (A-MSDU) and aggregated MAC protocol data unit (A-MPDU) can be used to improve efficiency/throughput but aggregation makes it difficult for LLT STAs to access the channel. Also, with current aggregation techniques, data rate control of individual MPDUs/PSDUs included in the PPDU is not possible. Also, with current aggregation techniques, transmitting different MPDUs/PSDUs included in the PPDU using different transmission power is not possible.

Multi-link operation (MLO) is a technique that allows wireless devices to simultaneously transmit and/or receive data in different frequency bands and channels. MLO may suffer from performance/efficiency degradation due to out-of-band (OOB) emission interference between adjacent links. Due to such in-device OOB emission interference between adjacent links, a NSTR multi-link device (MLD) cannot transmit data on one link and receive data on another link at the same time.

FIG. 10 is a diagram showing OOB emission interference problem in a NSTR non-AP MLD, according to some embodiments.

As shown in the diagram, a multi-link device (MLD) (e.g., AP MLD 1000 and non-AP MLD 1030) may transmit data by accessing channels on multiple links (e.g., wireless link A and wireless link B-referred to herein simply as "link A" and "link B"). AP MLD 1000 and non-AP MLD 1030 may have components that operate independently on link A and link B, which are on different channels. AP MLD 1000 may implement AP1 1010A and AP2 1010B, which are capable of operating independently on separate links. Non-AP MLD 1030 may implement STA 1030A and STA2 1030B, which are capable of operating independently on separate links.

MLDs may simultaneously transmit and/or receive data using different channels in the same frequency band (e.g., in different channels in the 5 GHz band) or simultaneously transmit and/or receive data in different frequency bands (e.g., in the 2.4 GHZ, 5 GHZ, and 6 GHz bands). However, due to interference problems between adjacent links (e.g., in-device OOB emission interference), a MLD may not be allowed to transmit data on one link of a multi-link and receive data on another link of the multi-link.

In the example shown in the diagram, AP MLD 1000 operates a simultaneous transmit and receive (STR) link set. A STR link set is a set of links over which transmission and reception can occur simultaneously. In contrast, a non-simultaneous and receive (NSTR) link set is a set of links over which transmission and reception cannot occur simultaneously (e.g., due to OOB emission interference). In a NSTR link set, all links can transmit data at the same time or all links can receive data at the same time but different links cannot transmit and receive data at the same time. A MLD operating a NSTR link set may be referred to as a NSTR link set MLD or simply as NSTR MLD. A MLD operating a STR link set may be referred to as a STR link set MLD or simply as STR MLD. In the example shown in the diagram, the AP MLD 1000 is a STR MLD and the non-AP MLD 1030 is a NSTR MLD.

A NSTR MLD cannot perform asynchronous transmission on multiple links but must synchronize transmission on the multiple links by aligning the direction of transmission on all of the links (e.g., because, as previously mentioned, the NSTR MLD is not allowed to transmit data on one link and receive data on another link). For example, MLD 1040, which is a NSTR MLD that implements STA1 1050A and STA2 1050B, is not allowed to simultaneously transmit a transmitting frame 1060 (via STA1 1050A) in channel A and receive a receiving frame 1070 (via STA2 1050B) in channel B due to OOB emission interference (e.g., the transmission of transmitting frame 1060 in channel A causes interference on the reception of receiving frame 1070 in channel B). As will be further described herein, the need to synchronize transmission direction in a NSTR link set may result in increased latency.

Figure 11:
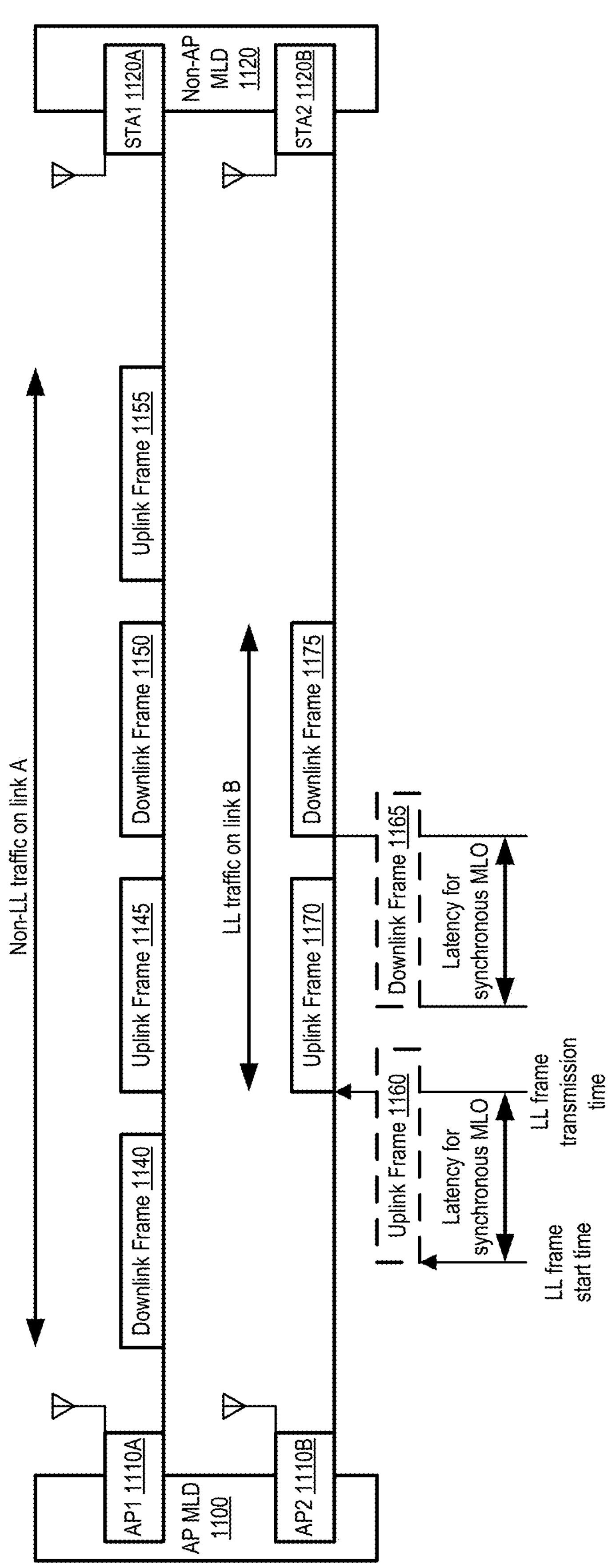
FIG. 11 is a diagram showing latency in non-simultaneous transmit and receive (NSTR) multi-link operation (MLO), according to some embodiments.

FIG. 11 is a diagram showing latency in NSTR MLO, according to some embodiments.

As shown in the diagram, the AP MLD 1100 may implement AP1 1110A and AP2 1110B and the non-AP MLD 1120 may implement STA1 1120A and STA2 1120B. The AP MLD 1100 and the non-AP MLD 1120 may communicate on link A and link B. For example, AP1 1110A may transmit a first downlink frame 1140 to STA1 1120A on link A. STA1 1120A may then transmit a first uplink frame 1145 to AP1 1110A on link A. AP1 1110A may then transmit a second downlink frame 1150 to STA1 1120A on link A. STA1 1120A may then transmit a second uplink frame 1155 to AP1 1110A on link A.

STA2 1120B may have an uplink frame 1160 with low latency data to transmit to AP2 1110B during the middle of AP1's 1110A transmission of downlink frame 1140. However, since non-AP MLD 1120 is a NSTR MLD, STA2 1120B is not allowed to transmit uplink frame 1160 to AP2 1110B on link B until STA1 1120A transmits uplink frame 1145 to AP1 1110A on link A to synchronize the transmission directions on both links. Similarly, AP2 1110B may have a downlink frame 1165 with low latency data to transmit to STA2 1120B during the middle of STA1's 1120A transmission of uplink frame 1145. However, AP2 1110B is not allowed to transmit downlink frame 1165 to STA2 1120B on link B until AP1 1110A transmits downlink frame 1150 to STA1 1120A on link A to synchronize the transmission directions on both links. The traffic transmitted on link A may be non-low latency traffic (non-LL traffic) and the traffic transmitted on link B may be low latency traffic (LL traffic). As a result, STA2's 1120B transmission of uplink frame 1160 and AP2's 1110B transmission of downlink frame 1165 on link B are delayed due to the need to synchronize transmission directions on link A and link B. Low latency traffic is typically small in size and can occur sporadically. Having to buffer such low latency traffic due to the need to synchronize transmission direction results in longer latency.

Figure 12:
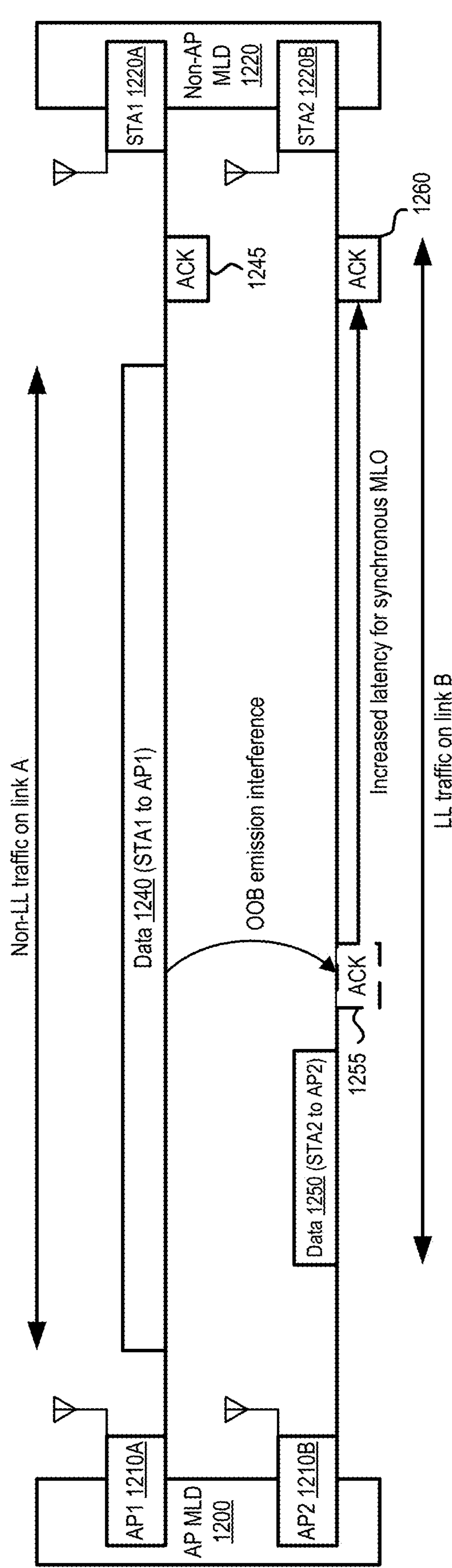
FIG. 12 is a diagram showing latency for an acknowledgement (ACK) frame in NSTR MLO, according to some embodiments.

FIG. 12 is a diagram showing latency for an ACK frame in NSTR MLO, according to some embodiments.

As shown in the diagram, the AP MLD 1200 may implement AP1 1210A and AP2 1210B and the non-AP MLD 1220 may implement STA1 1220A and STA2 1220B. The AP MLD 1200 and the non-AP MLD 1220 may communicate on link A and link B. For example, STA1 1220A may transmit data frame 1240 to AP1 1210A on link A. While STA1 1220A is transmitting data frame 1240 to AP1 1210A, STA2 1220B may transmit data frame 1250 to AP2 1210B on link B. In this example, it is assumed that the non-AP MLD 1220 is a NSTR MLD and may simultaneously transmit data frame 1240 and data frame 1250 on link A and link B, respectively, since they are being transmitted in the same direction. However, AP2 1210B cannot immediately transmit ACK frame 1255 to STA2 1220B (to acknowledge data frame 1250) due to the OOB emission interference problem at the non-AP MLD 1220.

AP2 1210B is not allowed to transmit ACK frame 1255 to STA2 1220B until after STA1 1220A finishes transmitting data frame 1240 to AP1 1210A. For example, AP2 1210B may transmit ACK frame 1255 to STA2 1220B when AP1 1210A transmits ACK frame 1245 to STA1 1220A. As a result, AP2's 1210B transmission of ACK frame 1255 on link B is delayed due to the need to synchronize transmission directions on link A and link B.

As will be described in further detail herein, embodiments use a multi-power and multi-rate aggregated physical layer service data unit (A-PSDU) to allow low latency transmission in a wireless network.

Figure 13:
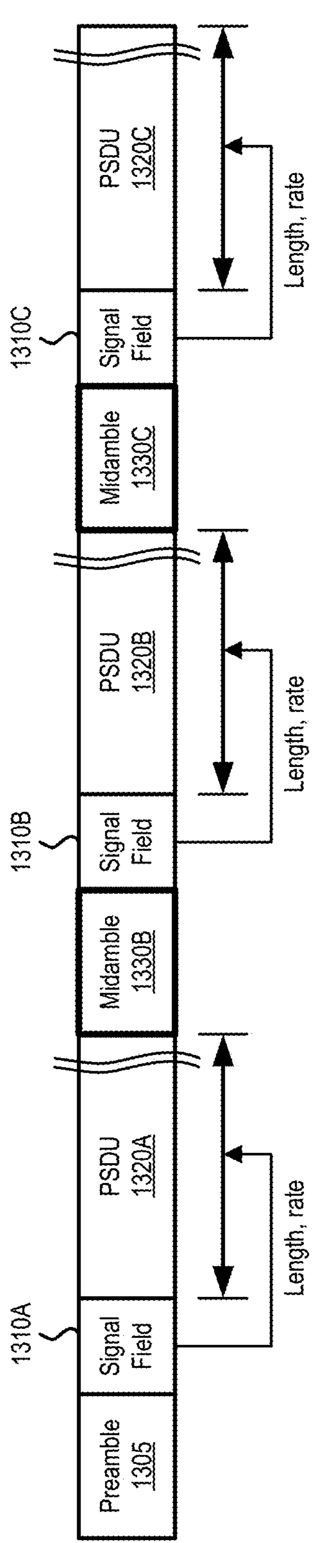
FIG. 13 is a diagram showing a format of a multi-power and multi-rate A-PSDU, according to some embodiments.

FIG. 13 is a diagram showing a format of a multi-power and multi-rate A-PSDU, according to some embodiments.

As shown in the diagram, the multi-power and multi-rate A-PSDU includes a preamble 1305, signal field 1310A, PSDU 1320A, midamble field 1330B, signal field 1310B, PSDU 1320B, midamble field 1330C, signal field 1310C, and PSDU 1320C. Each signal field 1310 may correspond to one of the PSDUs 1320. For example, signal field 1310A may correspond to PSDU 1320A, signal field 1310B may correspond to PSDU 1320B, and signal field 1310C may correspond to PSDU 1320C. Each signal field may include length information and rate information for its corresponding PSDU. For example, signal field 1310A may include length information and rate information for PSDU 1320A, signal field 1310B may include length information and rate information for PSDU 1320B, and signal field 1310C may include length information and rate information for PSDU 1320C. The length information may include information regarding the length of a PSDU 1320 (e.g., the number of bits). The rate information may include information regarding the data rate at which a PSDU 1320 is to be transmitted. Different PSDUs may be transmitted using different rates (e.g., using different modulation coding scheme (MCS)). For example, one or more of the PSDUs may be transmitted using a first rate and one or more of the PSDUs may be transmitted using a second rate that is more robust than the first rate (e.g., a lower data rate). Thus, the robustness of specific sections of the A-PSDU can be controlled. Also, different PSDUs may be transmitted for different durations. Each midamble field 1330 may correspond to one of the PSDUs 1320. For example, midamble field 1330B may correspond to PSDU 1320B and midamble field 1330C may correspond to PSDU 1320C. Different PSDUs included in the multi-power and multi-rate A-PSDU may be transmitted using different transmission powers. Thus, different PSDUs included in the multi-power and multi-rate A-PSDU may be transmitted using different transmission power, transmitted using different rates, and/or transmitted for different durations.

A wireless device receiving the multi-power and multi-rate A-PSDU may determine the duration of a particular PSDU 1320 included in the A-PSDU based on the length information and rate information for the particular PSDU included in the signal field 1310 corresponding to the particular PSDU. Also, a wireless device receiving the multi-power and multi-rate A-PSDU may automatically control the gain of a particular PSDU included in the A-PSDU using the midamble field 1330 corresponding to the particular PSDU.

In an embodiment, certain PSDUs included in the multi-power and multi-rate A-PSDU are transmitted using a lower transmission power and using a more robust data rate (compared to other PSDUs included in the A-PSDU) and low latency transmission by other wireless devices is allowed during the transmission of such PSDUs. Thus, the robustness of different sections (e.g., PSDUs) of a long A-PSDU can be controlled to allow low latency transmission during particular sections of the long A-PSDU.

While for the sake of simplicity of explanation the diagram shows the multi-power and multi-rate A-PSDU as including three PSDUs, it should be appreciated that the multi-power and multi-rate A-PSDU can include a different number of PSDUs than shown in the diagram.

Figure 14:
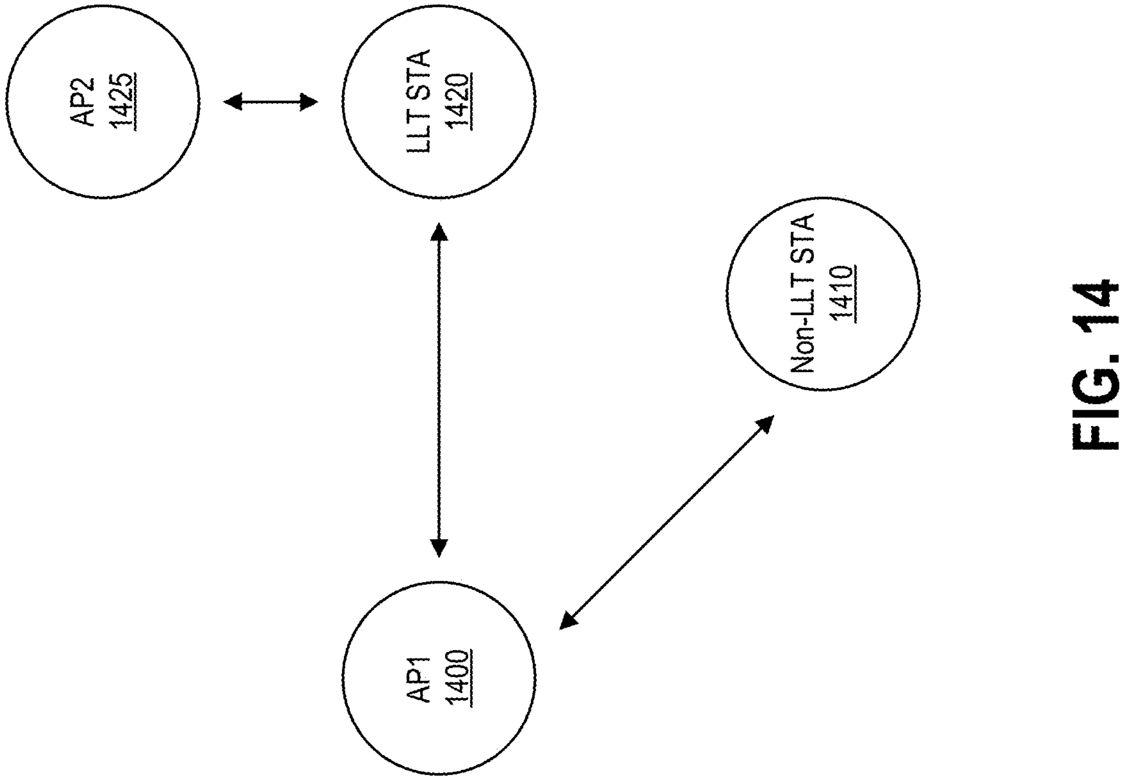
FIG. 14 is a diagram showing an example network configuration in which transmitting a single destination multi-power and multi-rate A-PSDU allows low latency transmission, according to some embodiments.

FIG. 14 is a diagram showing an example network configuration in which transmitting a single destination multi-power and multi-rate A-PSDU allows low latency transmission, according to some embodiments.

As shown in the diagram, the network includes a first AP (AP1) 1400 that can communicate with a non-LLT STA 1410 and a LLT STA 1420 and a second AP (AP2) 1425 that can communicate with LLT STA 1420.

In an embodiment, AP1 1400 transmits a multi-power and multi-rate A-PSDU to the non-LLT STA 1410 during AP1's 1400 long TXOP. This A-PSDU is a single destination A-PSDU since it is intended for a single destination (non-LLT STA 1410). AP1 1400 may transmit the multi-power and multi-rate A-PSDU using a format similar to the format shown in FIG. 13 to control the transmission power and rate/robustness of different sections (e.g., PSDUs) within the multi-power and multi-rate A-PSDU. The LLT STA 1420 may be allowed to transmit low latency data to AP2 1425 while AP1 1400 transmits the low (transmission) power and low rate (more robust) sections of the multi-rate A-PSDU to the non-LLT STA 1410. This is because the non-LLT STA 1410 may be able to successfully receive the low power and low rate sections of the multi-power and multi-rate A-PSDU despite the presence of interference from the LLT STA's 1420 (low latency) transmission because the low power and low rate sections of the multi-rate A-PSDU are more robust. Also, transmitting sections of the multi-power and multi-rate A-PSDU using lower transmission power reduces the level of interference with low latency data transmitted at the same time.

Figure 15:
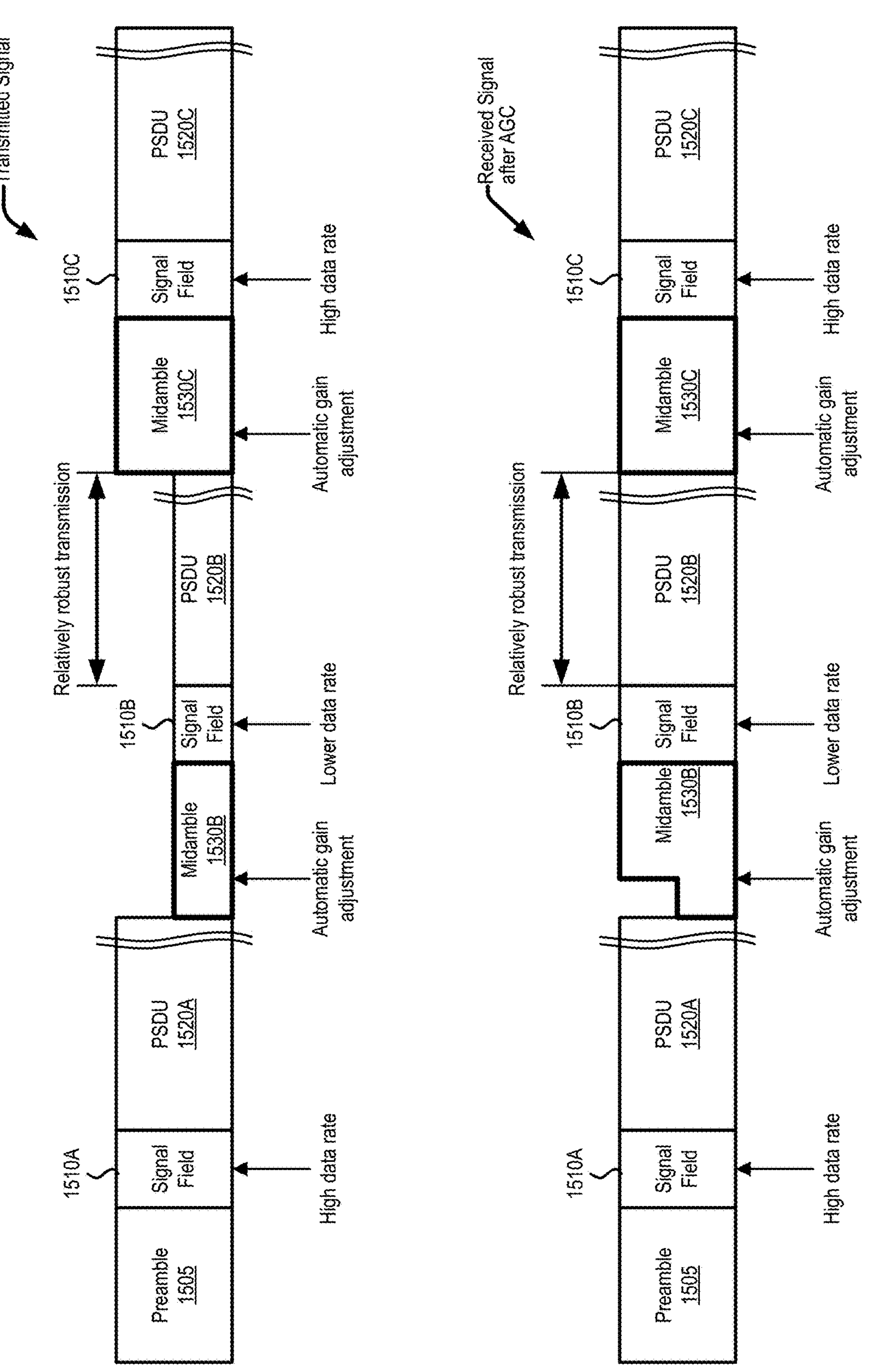
FIG. 15 is a diagram showing a transmitted signal for a multi-power and multi-rate A-PSDU and a received signal for the multi-power and multi-rate A-PSDU after automatic gain adjustment, according to some embodiments.

FIG. 15 is a diagram showing a transmitted signal for a multi-power and multi-rate A-PSDU and a received signal for the multi-power and multi-rate A-PSDU after automatic gain adjustment, according to some embodiments.

As shown in the diagram, the multi-power and multi-rate A-PSDU may include a preamble 1505, signal field 1510A, PSDU 1520A, midamble 1530B, signal field 1510B, PSDU 1520B, midamble 1530C, signal field 1510C, and PSDU 1520C. In the transmitted signal, preamble 1505, signal field 1510A, and PSDU 1520A PSDU may be transmitted using a high transmission power, midamble 1530B, signal field 1510B, and PSDU 1520B may be transmitted using a lower transmission power (as depicted in the diagram by the fields being shorter), and midamble 1530C, signal field 1510C, and PSDU 1520C may be transmitted using a high transmission power. Also, in the transmitted signal, PSDU 1520A may be transmitted using a high data rate, PSDU 1520B may be transmitted using a lower data rate, and PSDU 1520C may be transmitted using a high data rate. Thus, signal field 1510A may include rate information indicating that PSDU 1520A will be transmitted using a high rate, signal field 1510B may include rate information indicating that PSDU 1520B will be transmitted using a lower (more robust) rate, and signal field 1510C may include rate information indicating that PSDU 1520C will be transmitted using a high rate. In an embodiment, the high rate and the lower rate correspond to different modulation coding schemes (e.g., the high rate may correspond to MCS7 (MCS index 7) and the lower rate may correspond to MSC0 (MCS index 0)). Thus, the transmission of PSDU 1520B is a relatively robust transmission. Since PSDU 1520B is transmitted using a lower transmission power and lower (more robust) rate, low latency transmission can be allowed during the transmission of PSDU 1520B (e.g., as described above with reference to FIG. 14). That is, a LLT STA may perform overlapped transmission during a low power and low rate section (e.g., PSDU 1520B) of the multi-power and multi-rate A-PSDU. The LLT STA may transmit low latency data using a low (more robust) rate (e.g., low MCS) in consideration of possible interference by the non-low latency transmission. Using such technique, low latency data can be transmitted in the middle of a TXOP. Although the low latency data is transmitted using a low rate, being able to transmit the low latency data during the middle of the TXOP may be more advantageous compared to transmitting the low latency data using a higher rate after the TXOP has expired, particularly if the low latency data is highly sensitive to latency.

In the received signal, automatic gain adjustment may be performed based on midamble field 15030B to adjust the gain (increase the gain) of midamble 1530B, signal field 1510B, and PSDU 1520B. For example, the wireless device receiving the multi-power and multi-rate A-PSDU may measure the receiving power using the STF field of midamble 1530B and perform automatic gain control (AGC) to adjust the power and decode the signal.

Figure 16:
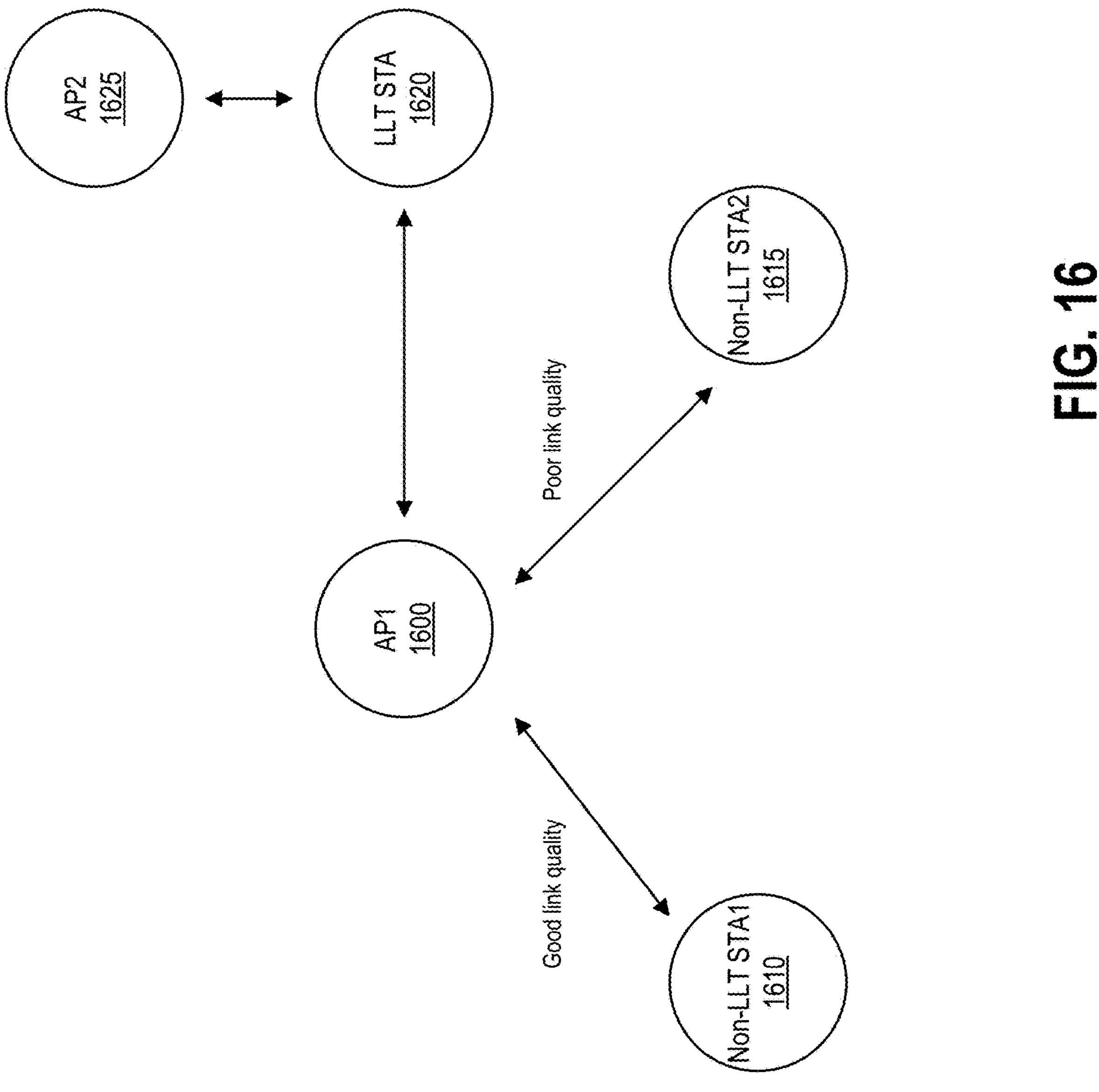
FIG. 16 is a diagram showing a network configuration in which transmitting a multi-destination multi-power and multi-rate A-PSDU allows low latency transmission, according to some embodiments.

FIG. 16 is a diagram showing a network configuration in which transmitting a multi-destination multi-power and multi-rate A-PSDU allows low latency transmission, according to some embodiments.

As shown in the diagram, the network includes AP1 1600 that can communicate with non-LLT STA1 1610, non-LLT STA2 1615, and a LLT STA 1620 and AP2 1625 that can communicate with the LLT STA 1620.

In an embodiment, AP1 1600 measures the link qualities of the links between AP1 1600 and the non-LLT STAs, and transmits a multi-power and multi-rate A-PSDU that includes PSDUs intended for the multiple non-LLT STAs, where the transmission power and the rate at which a particular PSDU in the A-PSDU is transmitted depends on the link quality between AP1 1600 and the intended recipient of the particular PSDU. For example, AP1 1600 may determine that the link between AP1 1600 and non-LLT STA1 1610 has good link quality and that the link between AP1 1600 and non-LLT STA2 1615 has poor link quality. AP1 1600 may thus transmit a multi-power and multi-rate A-PSDU that includes a first PSDU intended for non-LLT STA1 1610 and a second PSDU intended for non-LLT STA2 1615, where the first PSDU is transmitted using a high transmission power and high rate and the second PSDU is transmitted using a lower transmission power and a lower rate. This A-PSDU is a multi-destination A-PSDU since it is intended for multiple destinations (e.g., non-LLT STA 1610 and non-LLT STA 1615). In addition to being transmitted using different transmission power and different rates, different PSDUs included in the multi-power and multi-rate A-PSDU may have different lengths. In this example, LLT STA 1620 may be allowed to transmit low latency data (e.g., to AP1 1600 (e.g., if AP1 is a MLD) or AP2 1625) while AP1 1600 transmits the second PSDU (which is transmitted using a lower transmission power and (more robust) lower rate) of the multi-power and multi-rate A-PSDU to non-LLT STA2 1615.

Figure 17:
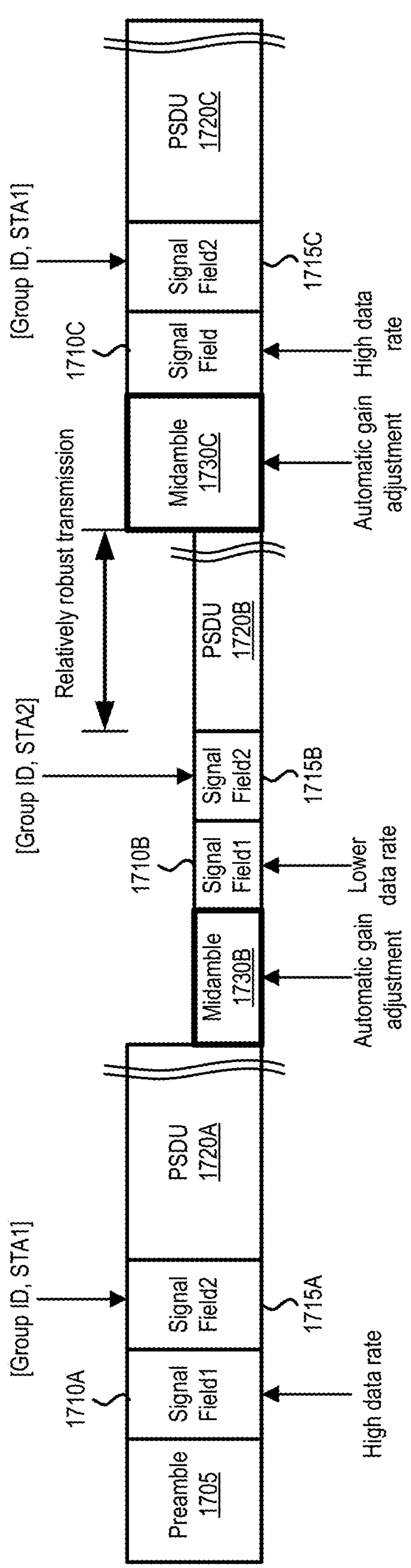
FIG. 17 is a diagram showing a multi-power and multi-rate A-PSDU with different PSDUs being transmitted to different recipients using different transmission power and rates, according to some embodiments.

FIG. 17 is a diagram showing a multi-power and multi-rate A-PSDU with different PSDUs being transmitted to different recipients using different transmission power and rates, according to some embodiments.

As shown in the diagram, the multi-power and multi-rate A-PSDU may include a preamble 1705, signal field1 1710A, signal field2 1715A, PSDU 1720A, midamble 1730B signal field1 1710B, signal field2 1715B, PSDU 1720B, midamble 1730C, signal field1 1710C, signal field2 1715C, and PSDU 1720C. Signal field1 1710A may include rate information indicating that PSDU 1720A will be transmitted using a high rate and signal field2 1715A may include a group ID and an identifier of non-LLT STA1 1610 (shown in FIG. 16) to indicate that PSDU 1720A is intended for non-LLT STA1 1610. Each STA may have a STA ID that identifies the STA. Each STA may be part of one or more groups, where each group is identified by a group ID. Also, signal field1 1710B may include rate information indicating that PSDU 1720B will be transmitted using a lower (more robust) rate and signal field2 1715B may include a group ID and an identifier of non-LLT STA2 1615 (shown in FIG. 16) to indicate that PSDU 1720B is intended for non-LLT STA2 1615. Also, signal field1 1710C may include rate information indicating that PSDU 1720C will be transmitted using a high rate and signal field2 1715C may include a group ID and an identifier of non-LLT STA1 1610 to indicate that PSDU 1720C is intended for non-LLT STA1 1610. Also, midamble 1730B, signal field1 1710B, signal field2 1715B, and PSDU 1720B may be transmitted using a lower transmission power. PSDU 1720B is transmitted using a lower (more robust rate) and thus is a relatively robust transmission. Since PSDU 1720B is transmitted using a lower transmission power and lower (more robust) rate, low latency transmission can be allowed during the transmission of PSDU 1720B, as described herein above.

As will be described in further detail herein, by including identifying information (e.g., group ID and individual STA ID) in the A-PSDU, in addition to length and rate information, STAs that detect the A-PSDU can check the signal field (e.g., signal field2 1715) to determine whether a particular PSDU is intended for itself and further process the particular PSDU (e.g., receive the entire PSDU and process the contents of the PSDU) if the particular PSDU is indeed intended for itself. Otherwise, if a STA determines that a particular PSDU is not intended for itself, then the STA may transition to a power save mode and stay in the power save mode while that particular PSDU is being transmitted to save power.

Figure 18:
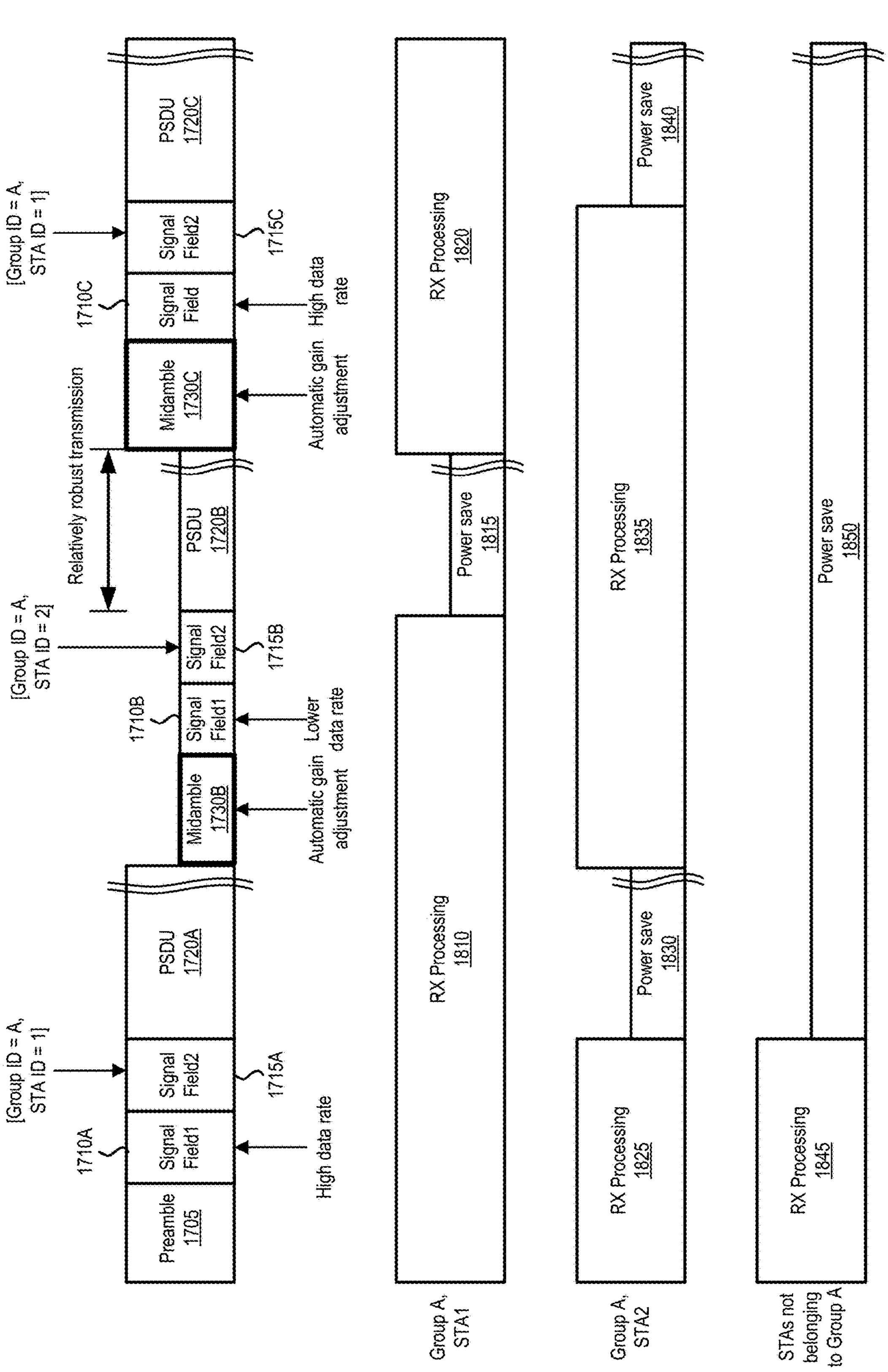
FIG. 18 is a diagram showing power saving that can be achieved using group ID and individual ID, according to some embodiments.

FIG. 18 is a diagram showing power saving that can be achieved using group ID and individual ID, according to some embodiments.

The diagram shows an example of STA behavior when detecting the multi-power and multi-rate A-PSDU shown in FIG. 17.

As shown in the diagram, STA1, which belongs to group A and has a STA ID of 1, may perform RX (receiving) processing 1810 of preamble 1705, signal field1 1710A, signal field2 1715A, PSDU 1720A, midamble 1730B signal field1 1710B, and signal field2 1715B. In this example signal field2 1715B indicates that its corresponding PSDU 1720B is intended for group ID A (group ID=A) and STA ID 2 (STA ID=2). Thus, STA1 may determine based on the identifying information included in signal field2 1715B that PSDU 1720B is not intended for itself. Thus, STA1 may transition to power save mode 1815 and stay in the power save mode 1815 while PSDU 1720B is transmitted. After PSDU 1720B is transmitted (or shortly therebefore), STA1 may transition out of the power save mode 1815 and perform RX processing 1820 of midamble 1730C, signal field1 1710C, signal field2 1715C, and PSDU 1720C.

STA2, which belongs to group A and has a STA ID of 2, may perform RX processing 1825 of preamble 1705, signal field1 1710A, and signal field2 1715A. In this example signal field2 1715A indicates that its corresponding PSDU 1720A is intended for group ID A (group ID=A) and STA ID 1 (STA ID=1). Thus, STA2 may determine based on the identifying information included in signal field2 1715A that PSDU 1720A is not intended for itself. Thus, STA2 may transition to power save mode 1830 and stay in the power save mode 1830 while PSDU 1720A is transmitted. After PSDU 1720A is transmitted (or shortly therebefore), STA2 may transition out of the power save mode 1830 and perform RX processing 835 of midamble 1730B signal field1 1710B, signal field2 1715B, PSDU 1720B, midamble 1730C, signal field1 1710C, and signal field2 1715C. In this example signal field2 1715C indicates that its corresponding PSDU 1720C is intended for group ID A (group ID=A) and STA ID 1 (STA ID=1). Thus, STA2 may determine based on the identifying information included in signal field2 1715C that PSDU 1720C is not intended for itself. Thus, STA2 may transition to power save mode 1840 and stay in the power save mode 1840 while PSDU 1720C is transmitted.

STAs that do not belong to group A may perform RX processing 1845 of preamble 1705, signal field1 1710A, and signal field2 1715A, and may determine based on the identifying information included in signal field2 1715A (which indicates group ID A) that none of the PSDUs included in the multi-power and multi-rate A-PSDU are intended for themselves (the assumption here is that all PSDUs included in the A-PSDU will be intended for STAs belonging to a single group (group A)). Thus, these STAs may transition to power save mode 1850 and stay in power save mode 1850 while the remainder of the multi-power and multi-rate A-PSDU is transmitted. STAs that belong to group A may check the signal field2 1715 corresponding to each PSDU to determine whether that PSDU is intended for themselves (and a STA may transition to power save mode if the PSDU is not intended for itself).

Figure 19:
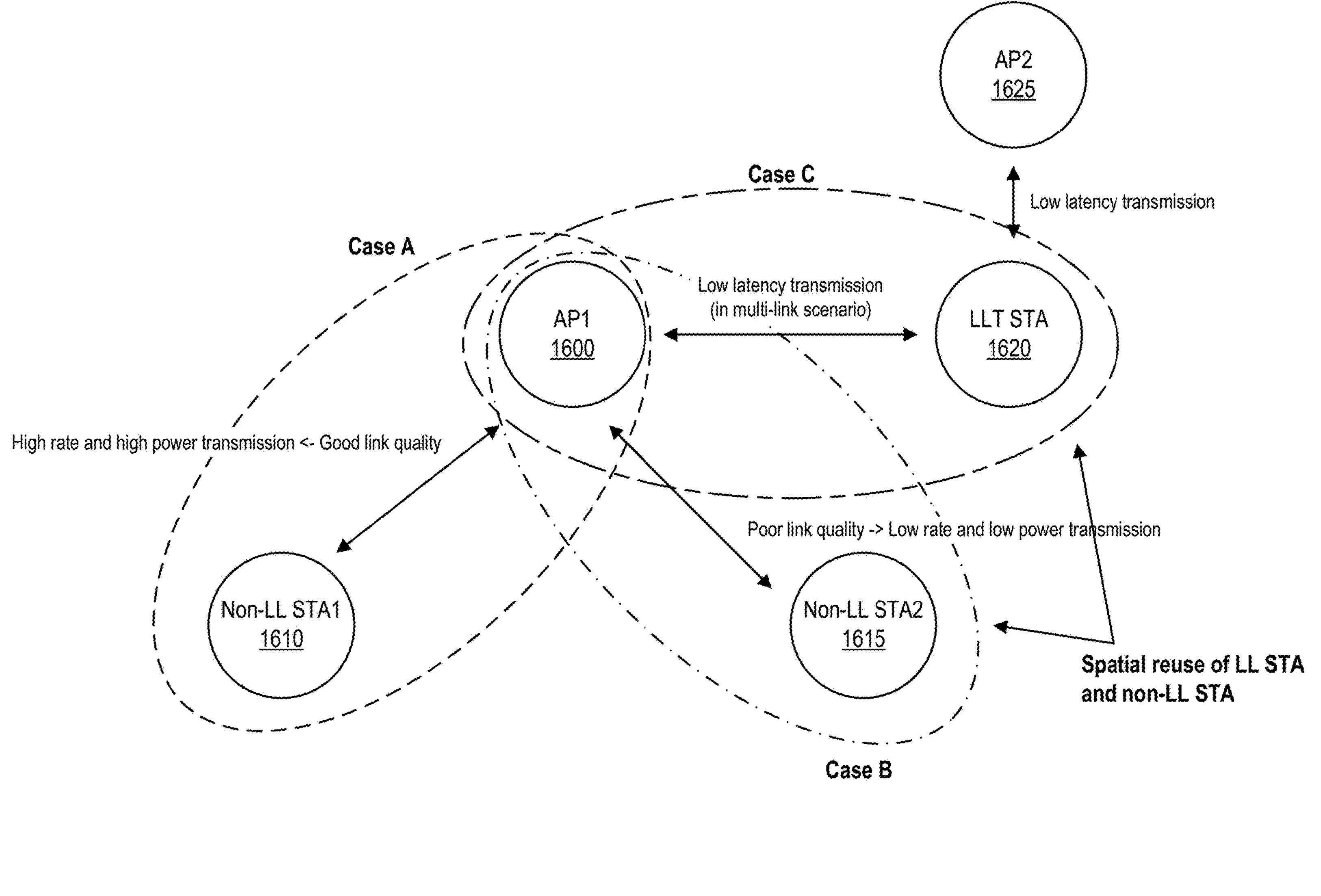
FIG. 19 is a diagram showing spatial reuse by LLT STA and non-LL STA, according to some embodiments.

FIG. 19 is a diagram showing spatial reuse by LLT STA and non-LL STA, according to some embodiments.

With embodiments, it is possible to achieve efficient spatial reuse when transmitting low latency data and non-low latency data. As shown in the diagram, in case A, high rate and high power transmission can be performed on a link with good link quality (the link between AP1 1600 and non-LLT STA 1610), and in case B, low rate and low power transmission can be performed on a link with poor link quality (the link between AP1 1600 and non-LLT STA 1615). In case C, low latency transmission can be performed by a LLT STA 1620 (with AP1 1600 (in a multi-link scenario) or with AP2 1625) simultaneously with the case B transmission, thereby achieving efficient spatial reuse.

Figure 20:
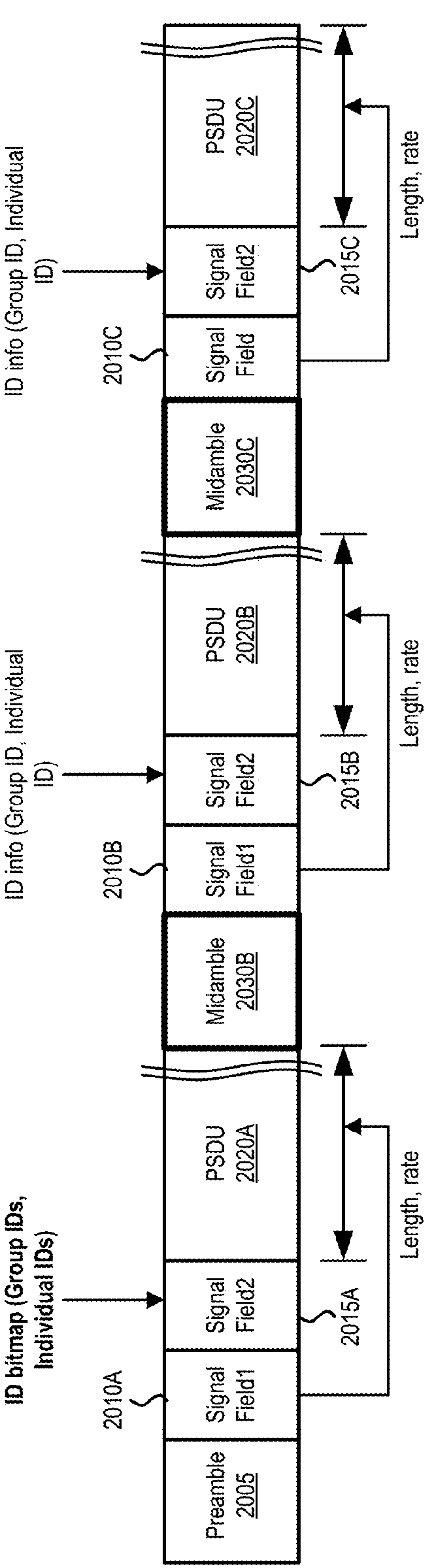
FIG. 20 is a diagram showing an ID bitmap being indicated using a signal field, according to some embodiments.

FIG. 20 is a diagram showing an ID bitmap being indicated using a signal field, according to some embodiments.

As shown in the diagram, the multi-power and multi-rate A-PSDU may include a preamble 2005, signal field1 2010A, signal field2 2015A, PSDU 2020A, midamble 2030B signal field1 2010B, signal field2 2015B, PSDU 2020B, midamble 2030C, signal field1 2010C, signal field2 2015C, and PSDU 2020C. In an embodiment, the first signal field2 in the A-PSDU, which is signal field2 2015A in this example, includes an ID bitmap indicating the wireless devices (e.g., STAs) that PSDUs included in the multi-power and multi-rate A-PSDU are intended for. In an embodiment, the ID bitmap may indicate which PSDUs included in the multi-power and multi-rate A-PSDU are intended for which wireless devices. The inclusion of such ID bitmap may increase the power saving effect. For example, a wireless device that detects the multi-power and multi-rate A-PSDU may consult the ID bitmap to determine whether any of the PSDUs included in the A-PSDU are intended for itself (and in some embodiments to determine which of the PSDUs are intended for itself). If a wireless device determines that the multi-power and multi-rate A-PSDU does not include any PSDUs intended for itself, the wireless device may transition to a power save mode (e.g., deep or shallow sleep mode) and stay in power save mode for the remainder of the A-PSDU transmission. The digital circuit of the wireless device may operate in power save mode by power gating or clock gating.

Figure 21:
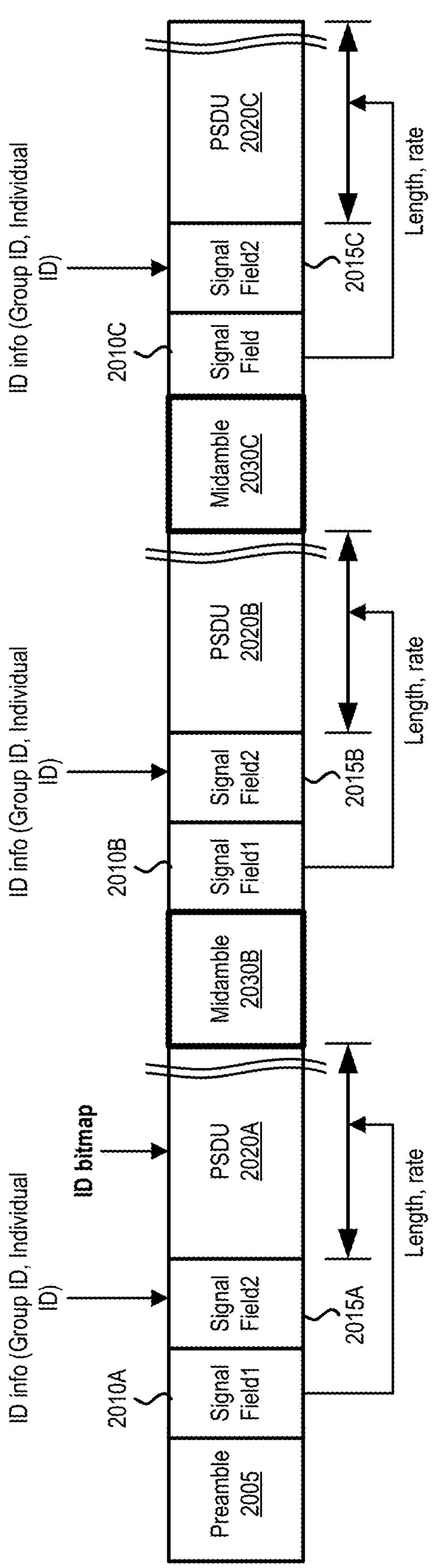
FIG. 21 is a diagram showing an ID bitmap being indicated in the data payload, according to some embodiments.

FIG. 21 is a diagram showing an ID bitmap being indicated in the data payload, according to some embodiments.

In an embodiment, as shown in the diagram, the first PSDU in the multi-power and multi-rate A-PSDU, which is PSDU 2020A in this example, includes an ID bitmap indicating the wireless devices (e.g., STAs) that PSDUs included in the multi-power and multi-rate A-PSDU are intended for. The ID bitmap may indicate the wireless devices that PSDUs included in the multi-power and multi-rate A-PSDU are intended for (and may also indicate which PSDUs are intended for which wireless devices). A wireless device that detects the multi-power and multi-rate A-PSDU may consult the ID bitmap to determine whether any of the PSDUs included in the A-PSDU are intended for itself (and in some embodiments to determine which of the PSDUs are intended for itself). If wireless device determines that the multi-power and multi-rate A-PSDU does not include any PSDUs intended for itself, the wireless device may transition to a power save mode (e.g., deep or shallow sleep mode) and stay in the power save mode for the remainder of the A-PSDU transmission.

Figure 22:
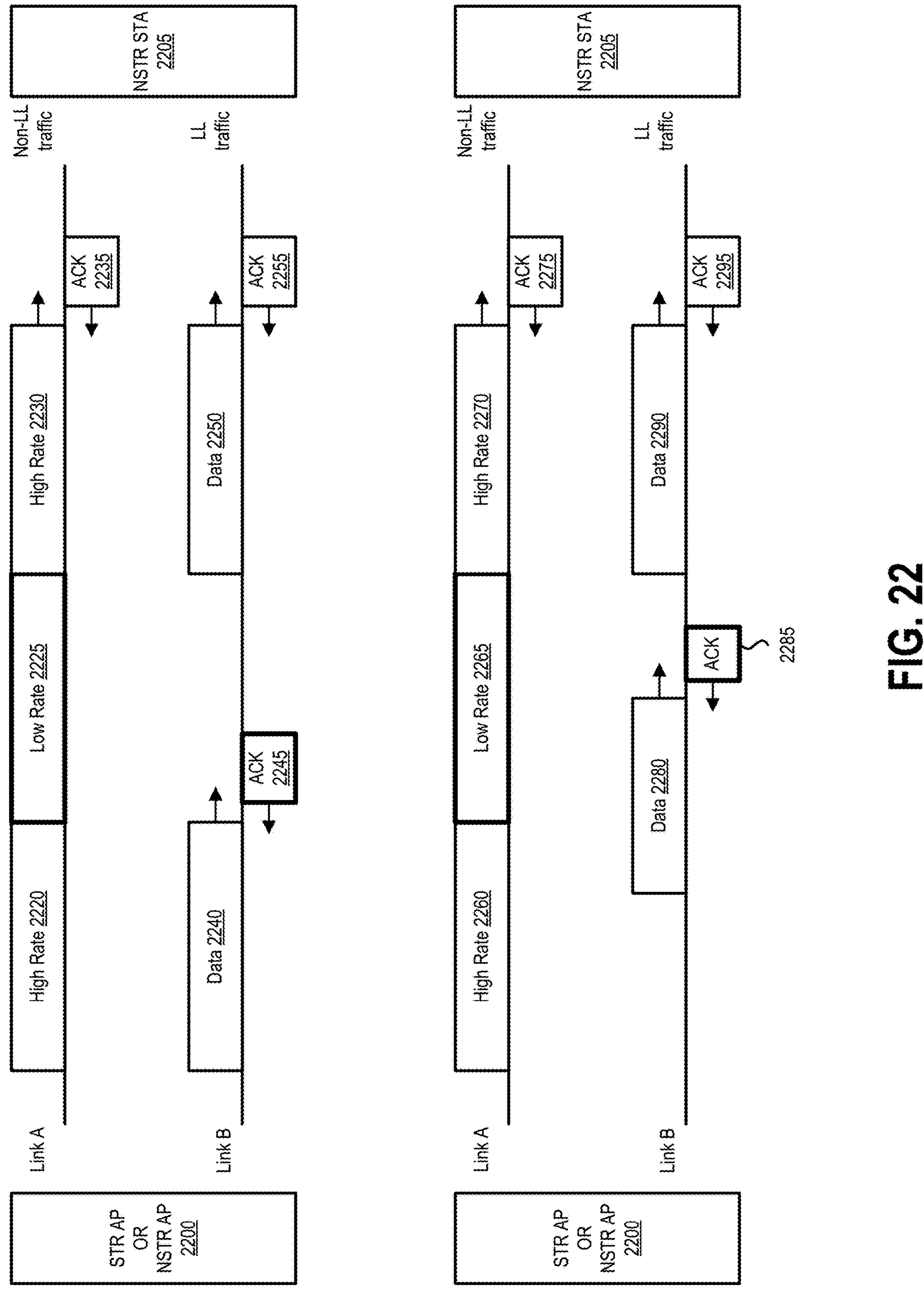
FIG. 22 is a diagram showing a low latency transmission during the transmission of a multi-power and multi-rate A-PSDU in a MLO scenario, according to some embodiments.

FIG. 22 is a diagram showing a low latency transmission during the transmission of a multi-power and multi-rate A-PSDU in a MLO scenario, according to some embodiments.

The diagram shows transmissions between an AP 2200 (which may be a STR AP or a NSTR AP) and a NSTR STA 2205. The AP 2200 and the NSTR STA 2205 may transmit data to each other on link A and link B. The traffic transmitted on link A may be non-low latency traffic (non-LL traffic) and the traffic transmitted on link B may be low latency traffic (LL traffic). For example, as shown in the diagram, the AP 2200 may transmit a multi-power and multi-rate A-PSDU to the NSTR STA 2205 on link A. The multi-power and multi-rate A-PSDU may include PSDU 2220 that is transmitted using a high transmission power and a high rate, PSDU 2225 that is transmitted using a low transmission power and a lower rate, and PSDU 2230 that is transmitted using the high transmission power and the high rate. The AP 2200 may also transmit data frame 2240 to the NSTR STA 2205 on link B while the AP 2200 transmits high power and high rate PSDU 2220 to the NSTR STA 2205 on link A. The NSTR STA 2205 may transmit ACK frame 2245 that acknowledges data frame 2240 to the AP 2200 on link B while the AP 2200 transmits low power and low rate PSDU 2225 to the NSTR STA 2205 on link A. This is because the NSTR STA 2205 may be able to successfully receive PSDU 2225 (which is transmitted using lower transmission power and a lower rate) of the multi-power and multi-rate A-PSDU on link A despite the presence of the OOB emission interference from the NSTR STA's 2205 transmission on link B because PSDU 2225 is transmitted in a robust manner. Also, by transmitting PSDU 2225 using low transmission power, it reduces interference with the transmission of ACK frame 2245. Also, ACK frame 2245 is transmitted in a robust manner so the AP 2200 may be able to successfully receive it despite the presence of OOB emission interference. The AP 2200 may also transmit data frame 2250 to NSTR STA 2205 on link B while the AP 2200 transmits high power and high rate PSDU 2230 on link A. The NSTR STA 2205 may then simultaneously transmit ACK frame 2235 that acknowledges the multi-rate A-PSDU to the AP 2200 on link A and ACK frame 2255 that acknowledges data frame 2250 to the AP 2200 on link B.

As another example, as shown in the diagram (in the bottom half), the AP 2200 may transmit a multi-power and multi-rate A-PSDU to the NSTR STA 2205 on link A. The multi-power and multi-rate A-PSDU may include PSDU 2260 that is transmitted using high transmission power and a high rate, PSDU 2265 that is transmitted using lower transmission power and a lower rate, and PSDU 2270 that is transmitted using the high transmission power and the high rate. The AP 2200 may also transmit data frame 2280 to the NSTR STA 2205 on link B while the AP 2200 transmits high power and high rate PSDU 2260 and low power and low rate PSDU 2265 on link A. The NSTR STA 2205 may transmit ACK frame 2285 that acknowledges data frame 2280 to the AP 2200 on link B while the AP 2200 transmits low power and low rate PSDU 2265 to the NSTR STA 2205 on link A. This is because the NSTR STA 2205 may be able to successfully receive PSDU 2265 (which is transmitted using a lower transmission power and a lower rate) of the multi-power and multi-rate A-PSDU on link A despite the presence of the OOB emission interference from the NSTR STA's 2205 transmission on link B because PSDU 2265 is transmitted in a robust manner. Also, by transmitting PSDU 2265 using low transmission power, it reduces interference with the transmission of ACK frame 2285. Also, ACK frame 2285 is transmitted in a robust manner so the AP 2200 may be able to successfully receive it despite the presence of OOB emission interference. The AP 2200 may also transmit data frame 2290 to the NSTR STA 2205 on link B while the AP 2200 transmits high power and high rate PSDU 2270 on link A. The NSTR STA 2205 may then simultaneously transmit ACK frame 2275 that acknowledges the multi-rate A-PSDU to the AP 2200 on link A and ACK frame 2295 that acknowledges data frame 2290 to the AP 2200 on link B.

Thus, when the AP MLD 2200 and the NSTR non-AP STA MLD 2205 communicate using multiple links (link A and link B) with OOB emission interference, low rate non-LL traffic and robust data transmission are also possible in uplink and downlink directions simultaneously.

While the examples shown in the diagram and described herein are examples where the AP 2200 transmits a multi-power and multi-rate A-PSDU to the NSTR STA 2205, in some cases the NSTR STA 2205 may transmit a multi-power and multi-rate A-PSDU to the AP 2200 (or another STA) to allow low latency transmission (during the low power and low rate sections of the A-PSDU). Thus, the example shown in the diagram should be regarded as illustrative rather than limiting.

The OOB emission characteristics (interference levels) can be measured in advance by STAs operating on the link and MCSs for each predefined interference level can be selected and transmitted. The MCS selection rule for each interference level may be implemented as a lookup table and may be referred to when the proposed method is operated. For example, the lookup table may indicate that a more robust MCS (lower MCS index) can be used when the link has poor link quality and a less robust (but higher data rate) MCS (higher MCS index) can be used when the link has good link quality.

Figure 23:
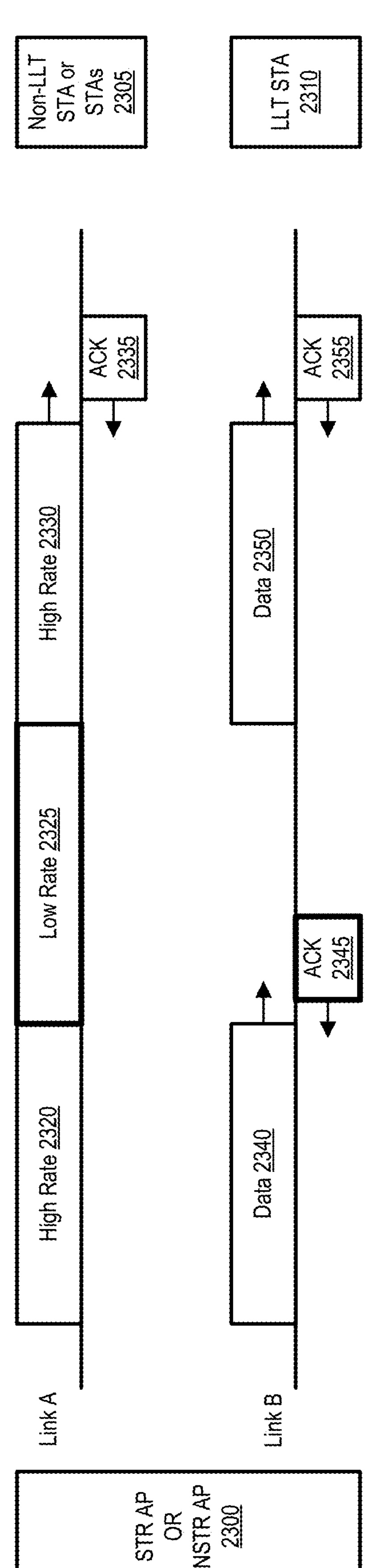
FIG. 23 is a diagram showing a low latency transmission during the transmission of a multi-power and multi-rate A-PSDU during multi-link operations in a multi-link operation scenario with non-MLD STAs, according to some embodiments.

FIG. 23 is a diagram showing a low latency transmission during the transmission of a multi-power and multi-rate A-PSDU during multi-link operations in a multi-link operation scenario with non-MLD STAs, according to some embodiments.

The diagram shows transmissions between an AP 2300 (which may be a STR AP or a NSTR AP) and a non-LLT STA 2305 (or STAs) and transmissions between the AP 2300 and a LLT STA 2310. The AP 2300 may be a MLD AP. Non-LLT STA 2305 and LLT STA 2310 may be non-MLD (single radio) STAs. The AP 2300 and the non-LLT STA 2305 may transmit data on link A. The AP 2300 and the LLT STA 2310 may transmit data on link B.

For example, as shown in the diagram, the AP 2300 may transmit a multi-power and multi-rate A-PSDU to the non-LLT STA 2305 (or STAs if the multi-power and multi-rate A-PSDU includes PSDUs intended for multiple STAs) on link A. The multi-power and multi-rate A-PSDU may include PSDU 2320 that is transmitted using a high transmission power and a high rate, PSDU 2325 that is transmitted using a lower transmission power and a lower rate, and PSDU 2330 that is transmitted using the high transmission power and the high rate. The AP 2300 may transmit data frame 2340 to the LLT STA 2310 on link B while the AP 2300 transmits high power and high rate PSDU 2320 on link A. The LLT STA 2310 may transmit ACK frame 2345 that acknowledges data frame 2340 to the AP 2300 on link B while the AP 2300 transmits low power and low rate PSDU 2325 to the non-LLT STA 2305 on link A. This is because the non-LLT STA 2305 may be able to successfully receive PSDU 2325 (which is transmitted using a lower transmission power and lower rate) of the multi-power and multi-rate A-PSDU on link A despite the presence of interference from the LLT STA's 2310 transmission on link B because PSDU 2325 is transmitted in a robust manner. Also, by transmitting PSDU 2325 using low transmission power, it reduces interference with the transmission of ACK frame 2345. Also, ACK frame 2345 is transmitted in a robust manner so the AP 2300 may be able to successfully receive it despite the presence of OOB emission interference. The AP 2300 may also transmit data frame 2350 to the LLT STA 2310 on link B while the AP 2300 transmits the high power and high rate PSDU 2330 on link A. The non-LLT STA 2305 may then transmit ACK frame 2335 that acknowledges the multi-power and multi-rate A-PSDU to the AP 2300 on link A. At the same time, the LLT STA 2310 may transmit ACK frame 2355 that acknowledges data frame 2350 to the AP 2300 on link B. In this way, asynchronous data communication is allowed when an AP MLD 2300 communicates with non-MLD STAs (e.g., non-LLT STA(s) 2305 and LLT STA 2310) on multiple links.

Figure 24:
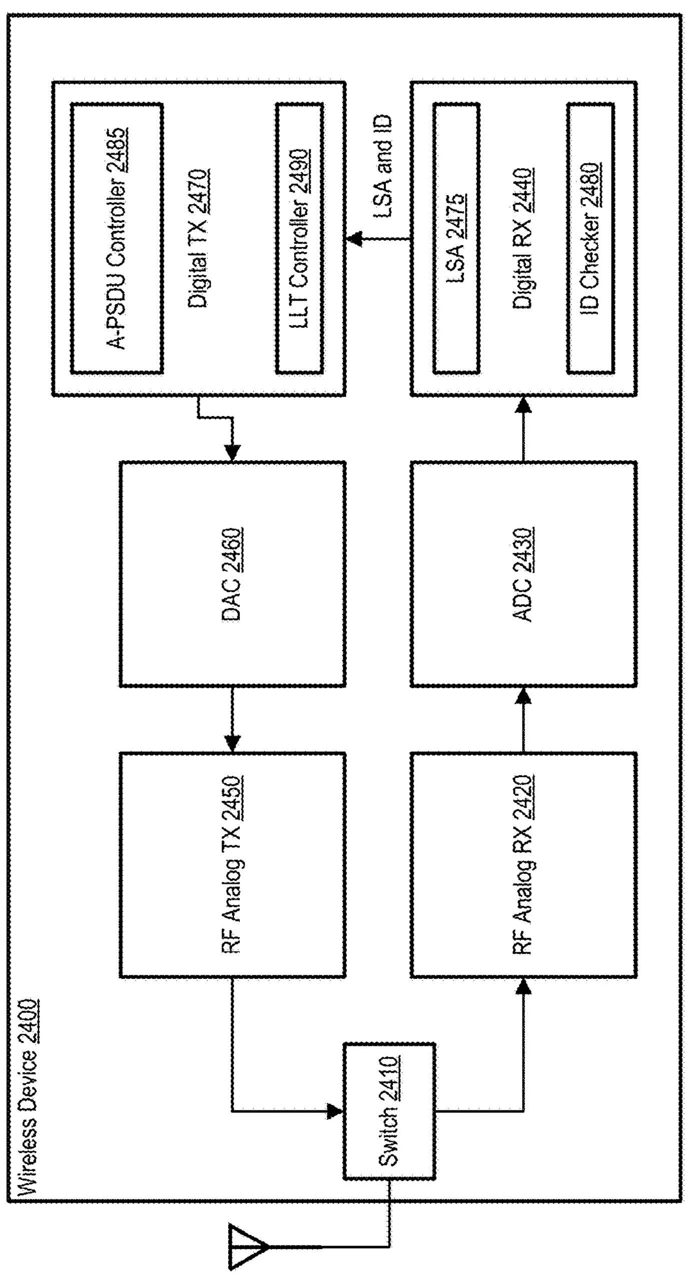
FIG. 24 is a diagram showing a configuration of a wireless device, according to some embodiments.

FIG. 24 is a diagram showing a configuration of a wireless device, according to some embodiments.

As shown in the diagram, the wireless device 2400 includes a digital transmitter (TX) 2470, a digital to analog converter (DAC) 2460, a RF analog TX 2450, a digital receiver (RX) 2440, an analog to digital converter (ADC) 2430, a RF analog RX 2420, and a switch 2410.

The switch 2410 may control whether transmission operations are being performed or reception operations are being performed.

The digital TX 2470 may generate digital signals for transmission. The digital TX 2470 may include a LLT controller 2490 and an A-PSDU controller 2485. The LLT controller 2490 may control low latency transmission operations of the wireless device 2400 (e.g., generate low latency frames that are to be transmitted during transmission of low power and low rate PSDUs of a multi-power and multi-rate A-PSDU, as described herein). The A-PSDU controller 2485 may generate multi-power and multi-rate A-PSDUs to allow low latency transmission in a wireless network (e.g., it may generate multi-power and multi-rate A-PSDUs to allow low latency transmission (e.g., in a single link or a multi-link scenario)). The digital TX 2470 may provide digital signals to the DAC 2460.

The DAC 2460 may convert digital signals into analog signals and provide the analog signals to the RF analog TX 2450.

The RF analog TX 2450 may generate analog radio-frequency signals for transmission and provide the signals to the switch 2410 so that they can be transmitted by the wireless device 2400 (e.g., via an antenna).

The RF analog RX 2420 may receive analog radio-frequency signals received by the wireless device 2400 (e.g., via an antenna and switch 2410). The RF analog RX 2420 may provide the signals to the ADC 2430.

The ADC 2430 may convert analog signals into digital signals and provide the digital signals to the digital RX 2440.

The digital RX 2440 may receive digital signals for processing. The digital RX 2440 may include a link state assessment (LSA) component 2475 and an ID checker component 2480. The LSA component 2475 may measure the link state/quality of links between the wireless device 2400 and other wireless devices (e.g., which can be used for generating a multi-power and multi-rate A-PSDU that includes PSDUs intended for multiple wireless devices, as described herein). The ID checker component 2480 may check the ID information (e.g., group ID and STA ID) included in a received multi-power and multi-rate A-PSDU (e.g., to determine whether a particular PSDU included in the A-PSDU is intended for the wireless device 2400 or not). The digital RX 2440 may provide LSA information and ID information to the digital TX 2470 (e.g., to allow the LLT controller to control low latency transmissions).

An advantage of embodiments disclosed herein is that they can guarantee long TXOPs for high throughput APs and/or non-AP STAs, while at the same time give LLT STAs (STAs that have low latency data to transmit) an opportunity to access the wireless medium during the middle of a TXOP acquired by a non-LLT STA in a wireless network that uses a distributed competition-based channel access mechanism. For example, in a wireless network that includes an AP, non-LLT STA, and LLT STA, the AP may transmit a multi-power and multi-rate A-PSDU to the non-LLT STA during a long TXOP period, and the LLT STA may transmit overlapped data frames that include low latency data during specific periods where the AP transmits using low transmission power and a low data rate. Thus, low latency transmission may be performed in the middle of a long TXOP section, thereby reducing the delay/latency of low latency data.

Figure 25:
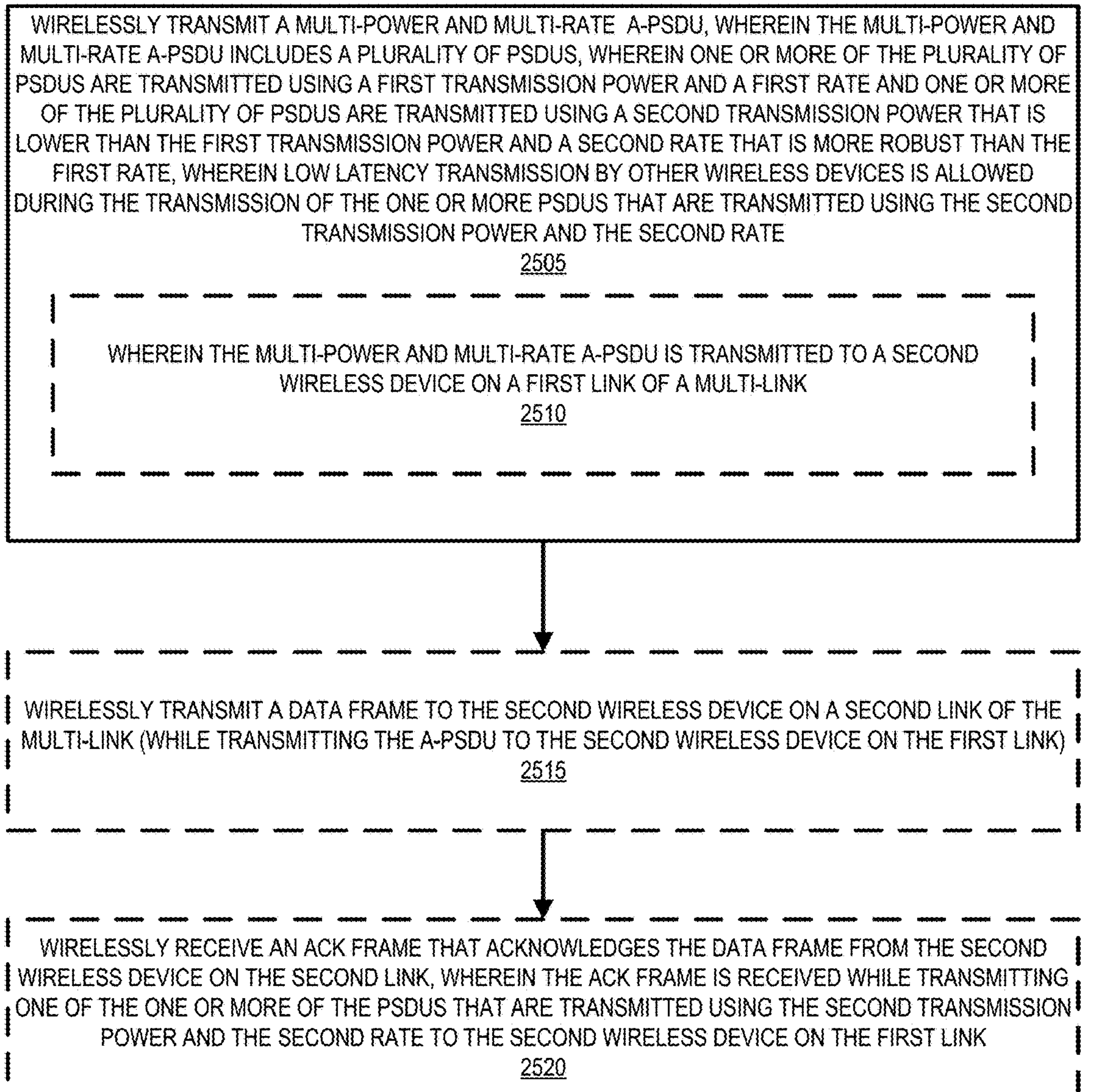
FIG. 25 is a flow diagram showing a method for transmitting a multi-power and multi-rate A-PSDU to allow low latency transmission, according to some embodiments.

Turning now to FIG. 25, a method 2500 will be described for transmitting a multi-power and multi-rate A-PSDU to allow low latency transmission, in accordance with an example embodiment. The method 2500 may be performed by one or more devices described herein. For example, the method 2500 may be performed by a first wireless device in a wireless network.

Additionally, although shown in a particular order, in some embodiments the operations of the method 2500 (and the other methods shown in the other figures) may be performed in a different order. For example, although the operations of the method 2500 are shown in a sequential order, some of the operations may be performed in partially or entirely overlapping time periods.

At operation 2505, the first wireless device wirelessly transmits a multi-power and multi-rate A-PSDU, wherein the multi-power and multi-rate A-PSDU includes a plurality of PSDUs, wherein one or more of the plurality of PSDUs are transmitted using a first transmission power and first rate and one or more of the PSDUs are transmitted using a second transmission power that is lower than the first transmission power and a second rate that is more robust than the first rate, wherein low latency transmission by other wireless devices is allowed during the transmission of the one or more PSDUs that are transmitted using the second transmission power and the second rate. In an embodiment, the first rate and the second rate correspond to different modulation coding schemes (MCS) (e.g., the second rate corresponds to a MCS having a lower index compared to the first rate). In an embodiment, the multi-power and multi-rate A-PSDU includes a plurality of first signal fields each corresponding to one of the plurality of PSDUs, wherein each of the plurality of first signal fields includes length information and rate information for a corresponding PSDU. In an embodiment, the multi-rate A-PSDU includes a plurality of second signal fields each corresponding to one of the plurality of PSDUs, wherein each of the plurality of second signal fields includes identifying information indicating a wireless device that the corresponding PSDU is intended for. In an embodiment, the identifying information includes a group identifier and a device identifier. In an embodiment, the multi-power and multi-rate A-PSDU includes one or more midambles each corresponding to one of the one or more of the plurality of PSDUs to allow receivers to perform automatic gain control. In an embodiment, the multi-power and multi-rate A-PSDU includes a signal field that precedes the plurality of PSDUs, wherein the signal field includes a bitmap indicating wireless devices that PSDUs included in the plurality of PSDUs are intended for. In an embodiment, a foremost PSDU of the plurality of PSDUs includes a bitmap indicating wireless devices that PSDUs included in the plurality of PSDUs are intended for.

In an embodiment, a second wireless device transmits low latency data to a third wireless device during the transmission of the one or more PSDUs that are transmitted using the second transmission power and the second rate (e.g., LLT STA 1420 transmits low latency data to AP2 1425 while AP1 1400 transmits a low power and low rate PSDU to non-LLT STA 1410).

In an embodiment, the first wireless device determines a link quality of a first link between the first wireless device and a second wireless device, determines, based on the link quality of the first link, that one of the plurality of PSDUs intended for the second wireless device is to be transmitted using the first transmission power and the first rate (e.g., because the first link has good link quality), determines a link quality of a second link between the first wireless device and a third wireless device, and determines, based on the link quality of the second link, that one of the plurality of PSDUs intended for the third wireless device is to be transmitted using the second transmission power and the second rate (e.g., because the second link has poor link quality).

In a MLO embodiment, the first wireless device is a multi-link device that performs multi-link operations on a first link and a second link. In such an embodiment, as shown in block 2510, the multi-power and multi-rate A-PSDU may be transmitted to a second wireless device on the first link of a multi-link.

In an embodiment (e.g., the MLO embodiment), at operation 2515, the first wireless device wirelessly transmits a data frame to the second wireless device on the second link of the multi-link (while transmitting the multi-power and multi-rate A-PSDU to the second wireless device on the first link). In an embodiment (e.g., the MLO embodiment), at operation 2520, the first wireless device wirelessly receives an ACK frame that acknowledges the data frame from the second wireless device on the second link, wherein the ACK frame is received while transmitting one of the one or more of the PSDUs that are transmitted using the second transmission power and the second rate to the second wireless device on the first link (e.g., as shown in the example shown in FIG. 22).

In an embodiment (e.g., the MLO embodiment), the first wireless device wirelessly transmits a data frame to a third wireless device on the second link and wirelessly receives an ACK frame that acknowledges the data frame from the third wireless device on the second link, wherein the ACK frame is received while transmitting one of the one or more of the PSDUs that are transmitted using the second transmission power and the second rate to a second wireless device on the first link (e.g., as shown in the example shown in FIG. 23).

Figure 26:
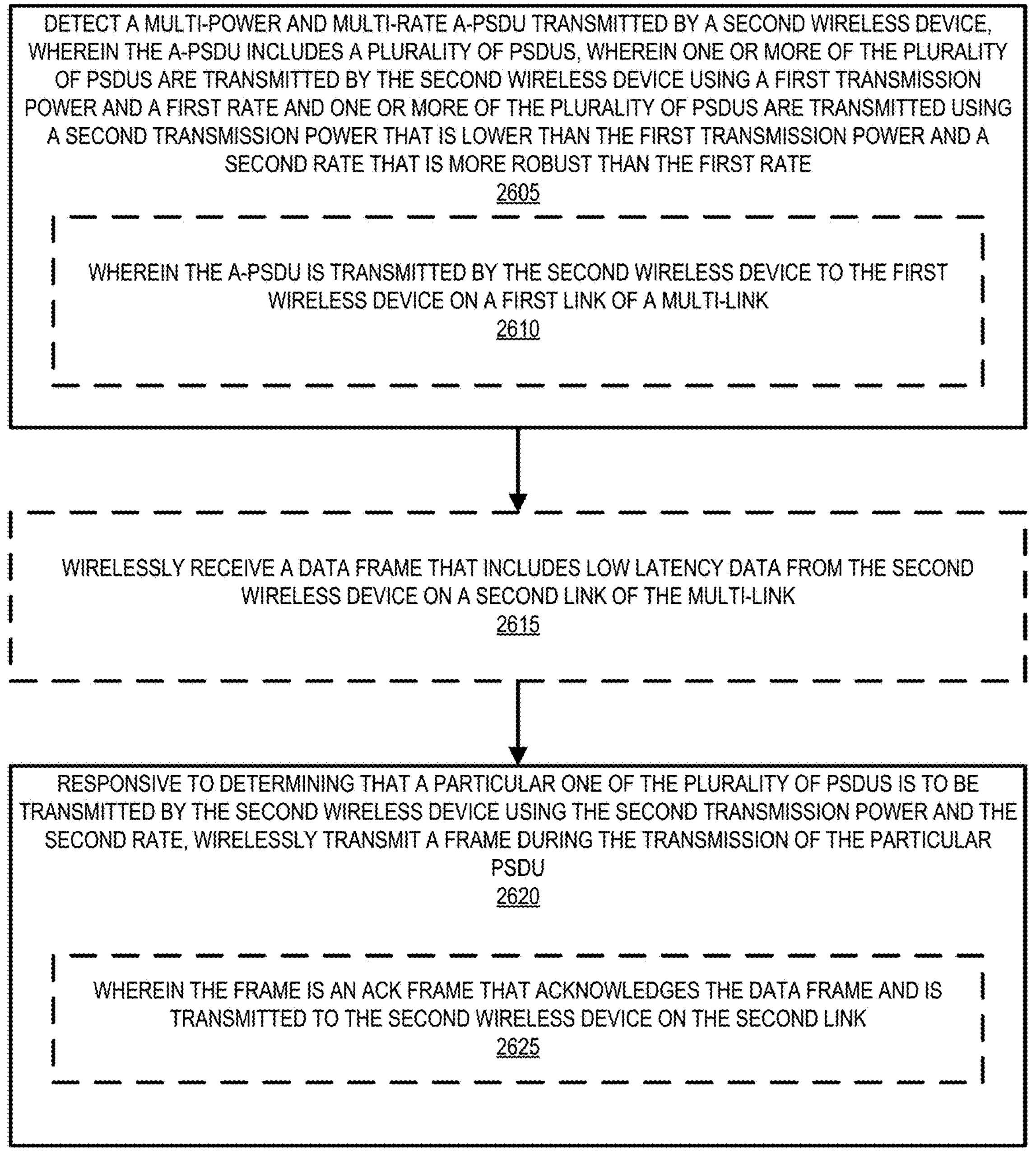
FIG. 26 is a flow diagram showing a method for transmitting data with low latency, according to some embodiments.

Turning now to FIG. 26, a method 2600 will be described for transmitting data with low latency, in accordance with an example embodiment. The method 2600 may be performed by one or more devices described herein. For example, the method 2600 may be performed by a first wireless device in a wireless network.

At operation 2605, the first wireless device detects a multi-power and multi-rate A-PSDU transmitted by a second wireless device, wherein the multi-power and multi-rate A-PSDU includes a plurality of PSDUs, wherein one or more of the plurality of PSDUs are transmitted by the second wireless device using a first transmission power and a first rate and one or more of the PSDUs are transmitted by the second wireless device using a second transmission power that is lower than the first transmission power and a second rate that is more robust than the first rate. In an embodiment, the first rate and the second rate correspond to different modulation coding schemes (MCS) (e.g., the second rate corresponds to a MCS having a lower index compared to the first rate).

In a MLO embodiment, the first wireless device is a multi-link device that performs multi-link operations on a first link and a second link. In the MLO embodiment, as shown in block 2610, the multi-power and multi-rate A-PSDU may be transmitted by the second wireless device to the first wireless device on the first link of a multi-link (and thus the multi-power and multi-rate A-PSDU is detected/received by the first wireless device on the first link).

In the MLO embodiment, at operation 2615, the first wireless device may wirelessly receive a data frame that includes low latency data from the second wireless device on the second link of the multi-link.

At operation 2620, responsive to determining that a particular one of the plurality of PSDUs is to be transmitted by the second wireless device using the second transmission power and the second rate, the first wireless device wirelessly transmits a frame during the transmission (by the second wireless device) of the particular PSDU. In the MLO embodiment, as shown in block 2625, the frame (which is transmitted during the transmission of the particular PSDU) may be an ACK frame that acknowledges the data frame and may be transmitted to the second wireless device on the second link (that is, the first wireless device may transmit the ACK frame to the second wireless device on the second link while the second wireless device transmits the particular PSDU using the second transmission power and the second rate). In an embodiment, the determination that the particular PSDU is to be transmitted by the second wireless device using the second rate is made based on information included in a first signal field corresponding to the particular PSDU included in the multi-power and multi-rate A-PSDU.

In an embodiment, the first wireless device determines whether another particular PSDU included in the plurality of PSDUs is intended for the first wireless device based on whether a group identifier and device identifier included in a second signal field corresponding to the another particular PSDU included in the multi-power and multi-rate A-PSDU matches a group identifier and device identifier of the first wireless device and further processes the another particular PSDU in response to determining that the another particular PSDU is intended for the first wireless device. In an embodiment, the first wireless device controls a gain of the another particular PSDU based on a midamble included in the multi-power and multi-rate A-PSDU that corresponds to the another particular PSDU. In an embodiment, the first wireless device transitions to a power save mode in response to determining that the another particular PSDU is not intended for the first wireless device.

In an embodiment, the first wireless device is not a multi-link device and the second wireless device is a multi-link device that performs multi-link operations on a first link and a second link. In such an embodiment, the multi-power and multi-rate A-PSDU may be transmitted by the second wireless device to a third wireless device on the first link. In this case, the first wireless device may receive a data frame that includes low latency data from the second wireless device on the second link. In this case, the frame that is transmitted during the transmission of the particular PSDU (at operation 2620) may be an ACK frame that acknowledges the data frame, wherein the ACK frame is transmitted to the second wireless device on the second link.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a first wireless device in a wireless network to transmit a multi-power and multi-rate aggregated physical layer service data unit (A-PSDU) to allow low latency transmission in the wireless network, the method comprising:

wirelessly transmitting the multi-power and multi-rate A-PSDU, wherein the multi-power and multi-rate A-PSDU includes a plurality of physical layer service data units (PSDUs), wherein one or more of the plurality of PSDUs are transmitted using first transmission power and a first rate and one or more of the PSDUs are transmitted using a second transmission power that is lower than the first transmission power and a second rate that is more robust than the first rate, wherein low latency transmission by other wireless devices is allowed during the transmission of the one or more PSDUs that are transmitted using the second transmission power and the second rate.

2. The method of claim 1, wherein the multi-power and multi-rate A-PSDU includes a plurality of first signal fields each corresponding to one of the plurality of PSDUs, wherein each of the plurality of first signal fields includes length information and rate information for a corresponding physical layer service data unit (PSDU).

3. The method of claim 2, wherein the multi-power and multi-rate A-PSDU includes a plurality of second signal fields each corresponding to one of the plurality of PSDUs, wherein each of the plurality of second signal fields includes identifying information indicating a wireless device that the corresponding physical layer service data unit (PSDU) is is intended for.

4. The method of claim 3, wherein the identifying information includes a group identifier and a device identifier.

5. The method of claim 3, further comprising:

determining a link quality of a first link between the first wireless device and a second wireless device;

determining, based on the link quality of the first link, that one of the plurality of PSDUs intended for the second wireless device is to be transmitted using the first transmission power and the first rate;

determining a link quality of a second link between the first wireless device and a third wireless device; and determining, based on the link quality of the second link, that one of the plurality of PSDUs intended for the third wireless device is to be transmitted using the second transmission power and the second rate.

6. The method of claim 1, wherein the multi-power and multi-rate A-PSDU includes one or more midambles each corresponding to one of the one or more of the plurality of PSDUs to allow receivers to perform automatic gain control.

7. The method of claim 1, wherein a second wireless device transmits low latency data to a third wireless device during the transmission of the one or more PSDUs that are transmitted using the second transmission power and the second rate.

8. The method of claim 1, wherein the multi-power and multi-rate A-PSDU includes a signal field that precedes the plurality of PSDUs, wherein the signal field includes a bitmap indicating wireless devices that PSDUs included in the plurality of PSDUs are intended for.

9. The method of claim 1, wherein a foremost physical layer service data unit (PSDU) of of the plurality of PSDUs includes a bitmap indicating wireless devices that PSDUs included in the plurality of PSDUs are intended for.

10. The method of claim 1, wherein the first wireless device is a multi-link device that performs multi-link operations on a first link and a second link, wherein the multi-power and multi-rate A-PSDU is transmitted to a second wireless device on the first link.

11. The method of claim 10, further comprising:

wirelessly transmitting a data frame to the second wireless device on the second link; and wirelessly receiving an acknowledgement (ACK) frame that acknowledges the data frame from the second wireless device on the second link, wherein the ACK frame is received while transmitting one of the one or more of the PSDUs that are transmitted using the second transmission power and the second rate to the second wireless device on the first link.

12. The method of claim 10, further comprising:

wirelessly transmitting a data frame to a third wireless device on the second link; and wirelessly receiving an acknowledgement (ACK) frame that acknowledges the data frame from the third wireless device on the second link, wherein the ACK frame is received while transmitting one of the one or more of the PSDUs that are transmitted using the second transmission power and the second rate to the second wireless device on the first link.

13. The method of claim 1, wherein the first rate and the second rate correspond to different modulation coding schemes.

14. A method performed by a first wireless device in a wireless network to transmit data with low latency, the method comprising:

detecting a multi-power and multi-rate aggregated physical layer service data unit (A-PSDU) transmitted by a second wireless device, wherein the multi-power and multi-rate A-PSDU includes a plurality of physical layer service data unit (PSDUs), wherein one or more of the plurality of PSDUs are transmitted by the second wireless device using a first transmission power and a first rate and one or more of the PSDUs are transmitted by the second wireless device using a second transmission power that is lower than the first transmission power and a second rate that is more robust than the first rate; and responsive to determining that a particular one of the plurality of PSDUs is to be transmitted by the second wireless device using the second transmission power and the second rate, wirelessly transmitting a frame during the transmission of the particular physical layer service data unit (PSDU).

15. The method of claim 14, wherein the determination that the particular PSDU is to be transmitted by the second wireless device using the second transmission power and the second rate is made based on information included in a first signal field corresponding to the particular PSDU included in the multi-power and multi-rate A-PSDU.

16. The method of claim 15, further comprising:

determining whether another particular PSDU included in the plurality of PSDUs is intended for the first wireless device based on whether a group identifier and device identifier included in a second signal field corresponding to the another particular PSDU included in the multi-power and multi-rate A-PSDU matches a group identifier and device identifier of the first wireless device; and further processing the another particular PSDU in response to determining that the another particular PSDU is intended for the first wireless device.

17. The method of claim 16, further comprising:

controlling a gain of the another particular PSDU based on a midamble included in the multi-power and multi-rate A-PSDU that corresponds to the another particular PSDU.

18. The method of claim 15, further comprising:

determining whether another particular PSDU included in the plurality of PSDUs is intended for the first wireless device based on whether a group identifier and device identifier included in a second signal field corresponding to the another particular PSDU included in the multi-power and multi-rate A-PSDU matches a group identifier and device identifier of the first wireless device; and transitioning to a power save mode in response to determining that the another particular PSDU is not intended for the first wireless device.

19. The method of claim 14, wherein the first wireless device is a multi-link device that performs multi-link operations on a first link and a second link, wherein the multi-power and multi-rate A-PSDU is received by the first wireless device on the first link.

20. The method of claim 19, further comprising:

wirelessly receiving a data frame that includes low latency data from the second wireless device on the second link, wherein the frame that is transmitted during the transmission of the particular PSDU is an acknowledgement (ACK) frame that acknowledges the data frame, wherein the ACK frame is transmitted to the second wireless device on the second link.

21. The method of claim 14, wherein the first wireless device is not a multi-link device and the second wireless device is a multi-link device that performs multi-link operations on a first link and a second link, wherein the multi-power and multi-rate A-PSDU is transmitted by the second wireless device to a third wireless device on the first link.

22. The method of claim 21, further comprising:

wirelessly receiving a data frame that includes low latency data from the second wireless device on the second link, wherein the frame that is transmitted during the transmission of the particular PSDU is an acknowledgement (ACK) frame that acknowledges the data frame, wherein the ACK frame is transmitted to the second wireless device on the second link.

23. The method of claim 14, wherein the first rate and the second rate correspond to different modulation coding schemes.

* * * * *